(12) United States Patent
Bates

(10) Patent No.: US 8,991,165 B2
(45) Date of Patent: Mar. 31, 2015

(54) SYSTEMS FOR ENERGY RECOVERY AND RELATED METHODS

(76) Inventor: Lyle Bates, Puyallup, WA (US)

( * ) Notice: Subject to any disclaimer, the term of this patent is extended or adjusted under 35 U.S.C. 154(b) by 962 days.

(21) Appl. No.: 12/947,040

(22) Filed: Nov. 16, 2010

(65) Prior Publication Data

US 2011/0114037 A1 May 19, 2011

Related U.S. Application Data

(60) Provisional application No. 61/261,720, filed on Nov. 16, 2009.

(51) Int. Cl.

| F01N 3/02 | (2006.01) |
| F01N 5/02 | (2006.01) |
| F02B 43/08 | (2006.01) |
| C01B 3/38 | (2006.01) |
| C01B 3/50 | (2006.01) |
| F01N 3/30 | (2006.01) |

(52) U.S. Cl.
CPC ... *F01N 5/02* (2013.01); *C01B 3/38* (2013.01); *C01B 3/501* (2013.01); *C01B 2203/0233* (2013.01); *C01B 2203/041* (2013.01); *C01B 2203/066* (2013.01); *C01B 2203/1241* (2013.01); *C01B 2203/84* (2013.01); *F01N 3/30* (2013.01); *Y02T 10/16* (2013.01); *Y02E 60/364* (2013.01)
USPC .................................. 60/320; 123/3

(58) Field of Classification Search
USPC .................. 60/320, 321, 614–624; 123/3
See application file for complete search history.

(56) References Cited

U.S. PATENT DOCUMENTS

| 3,532,467 | A | | 10/1970 | Smith et al. | |
| RE26,990 | E | | 11/1970 | Bongiorno | |
| 3,762,135 | A | | 10/1973 | Ikebe et al. | |
| 3,939,806 | A | * | 2/1976 | Bradley | 123/3 |
| 4,003,345 | A | * | 1/1977 | Bradley | 123/3 |
| 4,092,130 | A | | 5/1978 | Wikdahl | |
| 4,099,489 | A | * | 7/1978 | Bradley | 123/3 |
| 4,282,835 | A | | 8/1981 | Peterson et al. | |
| 4,480,595 | A | | 11/1984 | Hobby et al. | |
| 4,622,924 | A | * | 11/1986 | Lewis | 123/3 |
| 4,722,303 | A | | 2/1988 | Leonhard | |
| 5,000,003 | A | | 3/1991 | Wicks | |
| 5,343,699 | A | | 9/1994 | McAlister | |
| 5,531,811 | A | | 7/1996 | Kloberdanz | |
| 6,155,212 | A | * | 12/2000 | McAlister | 123/3 |

(Continued)

FOREIGN PATENT DOCUMENTS

| JP | 56040424 A | 4/1981 |
| JP | 10192602 A | 7/1998 |

(Continued)

OTHER PUBLICATIONS

Udengaard, Niels R., et al., Hydrogen Production by Steam Reforming of Hydrocarbons, Haldor Topsoe Inc., 2 pgs., Prepr. Pap.-Am. Chem. Soc., Div. Fuel Chem. 2004, 49(2), 906.

(Continued)

*Primary Examiner* — Christopher Jetton
(74) *Attorney, Agent, or Firm* — Stoel Rives LLP

(57) ABSTRACT

Energy recovery systems can utilize waste heat from an internal combustion engine or other base energy conversion system in the operation of hydrogen processors. Some energy recovery systems can utilize more than one source of waste heat from the energy converting system for this purpose.

38 Claims, 16 Drawing Sheets

(56) References Cited

U.S. PATENT DOCUMENTS

| | | | |
|---|---|---|---|
| 6,209,494 | B1 | 4/2001 | Manikowski, Jr. et al. |
| 6,228,148 | B1 | 5/2001 | Aaltonen et al. |
| 6,314,732 | B1 * | 11/2001 | Lookholder .................... 60/597 |
| 6,508,209 | B1 | 1/2003 | Collier, Jr. |
| 6,702,877 | B1 | 3/2004 | Swanborn |
| 6,968,700 | B2 | 11/2005 | Lott et al. |
| 7,153,489 | B2 | 12/2006 | Bingham et al. |
| 7,210,467 | B2 | 5/2007 | Kweon et al. |
| 7,293,533 | B2 | 11/2007 | Hemsath |
| 7,569,094 | B2 | 8/2009 | Kane et al. |
| 8,029,601 | B2 | 10/2011 | Franzen et al. |
| 2002/0046561 | A1 | 4/2002 | Bronicki et al. |
| 2005/0176831 | A1 | 8/2005 | Inui et al. |
| 2005/0183421 | A1 | 8/2005 | Vaynberg et al. |
| 2006/0182680 | A1 | 8/2006 | Keefer et al. |
| 2007/0137191 | A1 | 6/2007 | Kweon et al. |
| 2008/0010993 | A1 | 1/2008 | Morgenstern |
| 2008/0081844 | A1 | 4/2008 | Shires et al. |
| 2009/0056542 | A1 | 3/2009 | Carew |
| 2009/0176638 | A1 | 7/2009 | Bella |
| 2009/0200176 | A1 | 8/2009 | McCutchen et al. |
| 2009/0230359 | A1 | 9/2009 | Guvelioglu et al. |
| 2009/0266231 | A1 | 10/2009 | Franzen et al. |
| 2011/0132192 | A1 | 6/2011 | Bates |

FOREIGN PATENT DOCUMENTS

| | | | |
|---|---|---|---|
| WO | WO 2004/053305 | A1 | 6/2004 |
| WO | WO 2011/060399 | A2 | 5/2011 |
| WO | WO 2011/071873 | A2 | 10/2011 |

OTHER PUBLICATIONS

Youn, Moon-Jung, "Hydrogen Production from Methane Under an Oxygen-Enriched Conditions Using Compression Ignition Engine," J. Ind. Eng. Chem., vol. 13, No. 7, 2007, pp. 1117-1121.

Leung, Perry, "Raising the Fuel Heating Value and Recovering Exhaust Heat by On-board Oxidative Reforming of Bioethanol," Energy Environ. Sci., 2010, 3, pp. 780-788, first published on May 10, 2010.

Jamal, Y., et al., "Onboard Generation of Hydrogen-Rich Gaseous Fuels—a Review," International Journal of Hydrogen Energy, vol. 19, No. 7, pp. 557-572, 1994, Received for publication Sep. 1, 1993, 6 pgs.

Notification Concerning Transmittal of International Preliminary Report on Patentability dated May 31, 2012, issued in International Application No. PCT/US2010/056783, which claims priority to U.S. Appl. No. 61/261,720.

International Search Report dated Jul. 31, 2012, issued in International Application No. PCT/US2010/056783, which claims priority to U.S. Appl. No. 61/261,720.

Notification Concerning Transmittal of International Preliminary Report on Patentability dated Jun. 21, 2012, issued in International Application No. PCT/US2010/059224, which claims priority to U.S. Appl. No. 61/267,364.

International Search Report dated Aug. 31, 2011, issued in International Application No. PCT/US2010/059224, which claims priority to U.S. Appl. No. 61/267,364.

* cited by examiner

SYSTEMS FOR ENERGY RECOVERY AND RELATED METHODS

CROSS-REFERENCE TO RELATED APPLICATIONS

This application claims the benefit of U.S. Provisional Patent Application No. 61/261,720, titled SYSTEMS FOR ENERGY RECOVERY AND RELATED METHODS, which was filed on Nov. 16, 2009, the entire contents of which are hereby incorporated by reference herein.

TECHNICAL FIELD

The present disclosure relates generally to the field of energy recovery. More specifically, the present disclosure relates to recovering heat energy for use in the production of fuel.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments and are, therefore, not to be considered to be limiting of the scope of the disclosure, the embodiments will be described and explained with specificity and detail in reference to the accompanying drawings.

DETAILED DESCRIPTION

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments.

Certain embodiments of energy recovery systems disclosed herein are configured to recapture waste heat that is generated by a base energy conversion system and utilize the waste heat in the production of hydrogen fuel (e.g., hydrogen gas). The energy recovery systems thus can increase the overall efficiency of the base energy conversion systems, while producing hydrogen fuel in an economical and an environmentally beneficial manner. As more fully described below, certain of such systems can be operated on a relatively small scale, such as at a residential building or onboard an automotive vehicle. The systems thus can provide hydrogen fuel locally, which can reduce or eliminate challenges that may be associated with the distribution of hydrogen fuel. Other embodiments and advantages thereof will be apparent from the following discussion.

Figure 1:
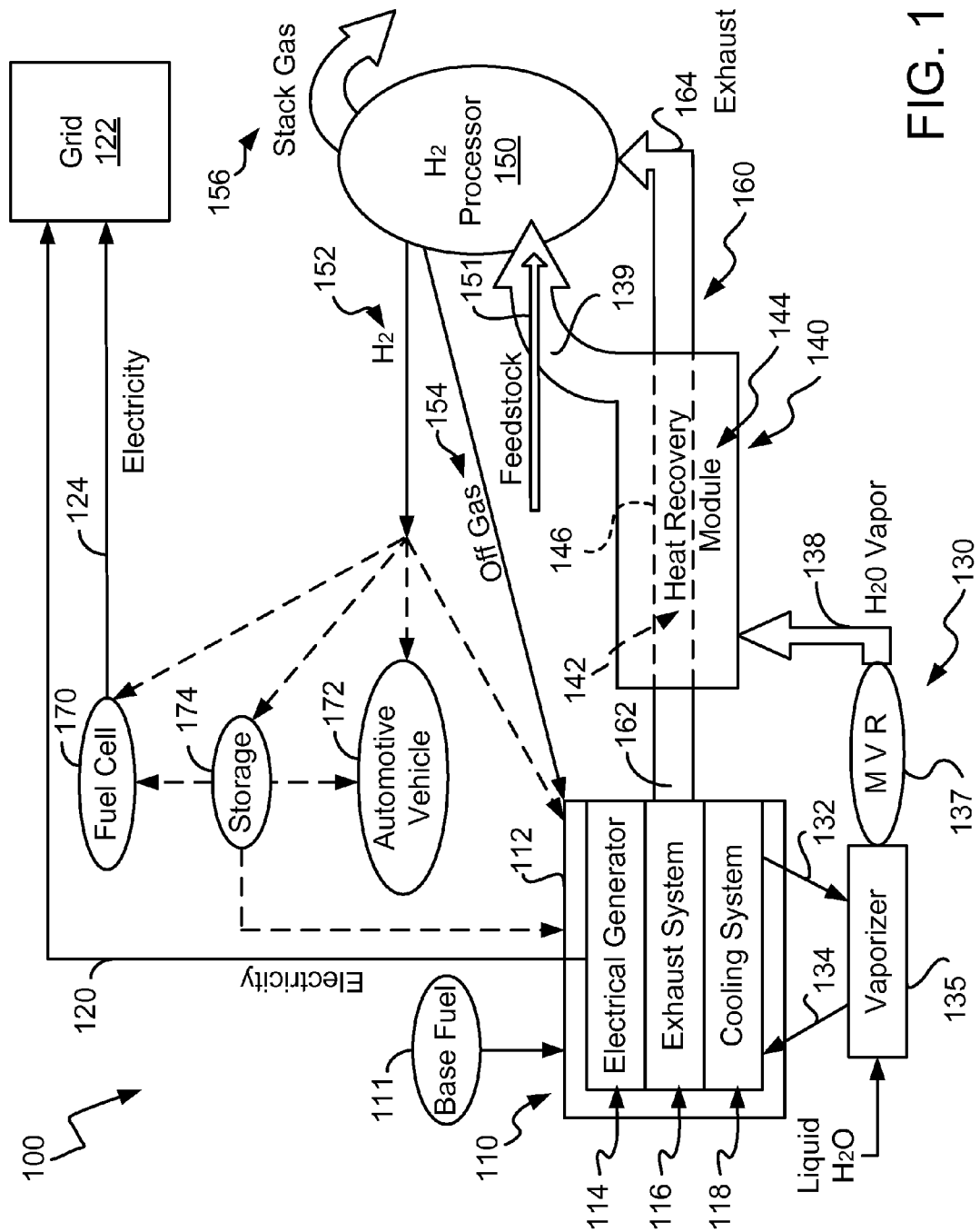
FIG. 1 is a schematic diagram of an embodiment of an energy recovery system that is configured to utilize waste heat from a base energy conversion system in the generation of hydrogen fuel.

FIG. 1 illustrates an embodiment of an energy recovery system 100 that includes a base energy conversion system 110. In the illustrated embodiment, the base energy conversion system 110 comprises an internal combustion engine 112, which is configured to convert a base fuel 111 into multiple forms of energy. The base fuel 111 can include, for example, gasoline, diesel, methane (or natural gas), propane, ethanol, and/or hydrogen. The converted energy forms can include electricity, high-grade waste heat (e.g., heated exhaust gases), low-grade waste heat (e.g., heated coolant fluids), and/or radiant heat. In the illustrated embodiment, converted energy is removed from the internal combustion engine 112 via an electrical generator 114, an exhaust system 116, and an engine cooling system 118.

As shown at arrow 120, converted energy in the form of electricity is recovered from the internal combustion engine 112 via the electrical generator 114. The electricity can be distributed to a power grid 122 or used in any other suitable manner.

The energy recovery system 100 can also recover low-grade heat energy from the internal combustion engine 112. In particular, heated liquid engine coolant is channeled from the engine cooling system 118 via a pathway 132 to a low-grade heat recovery and conveyance system 130. The low-grade heat recovery and conveyance system 130 can include a vaporizer 135 and a mechanical vapor recompressor 137. Once heat has been extracted from the liquid coolant by the low-grade heat recovery and conveyance system 130, the coolant can be returned to the engine cooling system 118 via a pathway 134. In some embodiments, the pathways 132, 134 may be integrally formed with each other or otherwise connected so as to define a substantially continuous pathway that passes through a vaporizer 135. In other embodiments, the pathways 132, 134 may be separated physical pathways. The term "pathway" is a broad term and includes one or more conduits, pipes, tubes, hoses, channels, passageways, and/or other conveyance devices, or a combination thereof. Certain pathways may be insulated to prevent or inhibit their contents from undergoing thermal changes due to contact therewith, whereas other pathways may be configured for ready thermal exchange with their environment.

As more fully described below, liquid water is supplied to the vaporizer 135 where it is allowed to thermally interact with the heated coolant and vaporize (e.g., transition to a gaseous state). The mechanical vapor recompressor 137 can induce a suitable reduced environmental pressure in the vaporizer 135, which can facilitate vaporization of liquid water and thereby yield a desirable form of heat transfer. The water vapor is then transferred into a mechanical vapor recompressor 137, where it is mechanically compressed such that its temperature and pressure are raised. The water vapor is then introduced into a heat recovery module 140 via a pathway 138.

When within the heat recovery module 140, the water vapor is permitted to thermally interact with heated exhaust from the exhaust system 116. The exhaust 116 can be contained within a first pathway, section, or environment 142 that is physically separated from a second pathway, section, or environment 144. The first and second environments 142, 144 can be in thermal communication with each other via any suitable thermal interface 146, such as, for example, a heat exchanger of any suitable variety. The heated exhaust within the first environment 142 can be at a higher temperature than the water vapor that is received into the second environment 144 via the pathway 138. Accordingly, the temperature of the water vapor can be raised by the heat recovery module 140 until it has reached a desired or predetermined level. The heated water vapor can then be delivered, via a pathway 139, to a hydrogen processor 150 where it is used to produce hydrogen.

The energy recovery system 100 can further recover high-grade heat energy from the internal combustion engine 112. In particular, heated exhaust is delivered from the exhaust system 118 into a high-grade heat recovery and conveyance system 160. The system 160 can include a pathway 162 through which the exhaust is channeled to the heat recovery module 140. As previously mentioned, the exhaust is contained within the first environment 142 when it is within the heat recovery module 140. The exhaust remains at a high temperature as it exits the heat recovery module and is delivered to the hydrogen processor 150 via a pathway 164.

The hydrogen processor 150 can comprise any suitable form of hydrogen processor, reactor, or reformer in which heat is used in the generation, separation, and/or purification of hydrogen gas. For example, the hydrogen processor 150 can employ high-temperature electrolysis, thermochemical processing, and/or catalytic steam reforming. In the illustrated embodiment, the hydrogen processor 150 comprises a catalytic steam reformer that generates ultrapure hydrogen by steam reforming a feedstock 151, which can include methanol, methane, and/or any other suitable composition. The feedstock 151 can be combined with the heated water vapor that is delivered to the hydrogen processor 150 by the low-grade heat recovery and conveyance system 130, and the hydrogen processor 150 can act on this input stream to yield purified hydrogen 152 and off gas 154. The off gas 154 can include uncollected hydrogen, unconverted feedstock 151, and/or impurities other than the feedstock 151 that would foul a fuel cell if used therein.

The heated exhaust can be used separately within the hydrogen processor 150 to provide proper temperature (or temperatures) for operation of the hydrogen processor 150. The spent exhaust can then be emitted from the hydrogen processor 150 as stack gas 156. Accordingly, the exhaust from the internal combustion engine 112 can proceed along a pathway through the hydrogen processor 150 that is physically separate from a pathway along which the heated water vapor and feedstock travel.

The purified hydrogen 152 can be used in a variety of applications, as indicated by the dashed arrows in FIG. 1. For example, at least a portion of the hydrogen 152 can be delivered to a fuel cell 170 where it is used to generate electricity. As shown at the arrow 124, the electricity can be delivered to the power grid 122, or it may be used in any other suitable manner. In other or further embodiments, at least a portion of the hydrogen 152 can be delivered to an automotive vehicle 172 where it can be used in a fuel cell and/or in a combustion engine. In still other or further embodiments, at least a portion of the hydrogen 152 can be delivered to the internal combustion engine 112 as fuel. In yet other or further embodiments, at least a portion of the hydrogen 152 can be delivered to one or more storage units 174 where it is retained for future use, such as in any of the applications just described.

Figure 2:
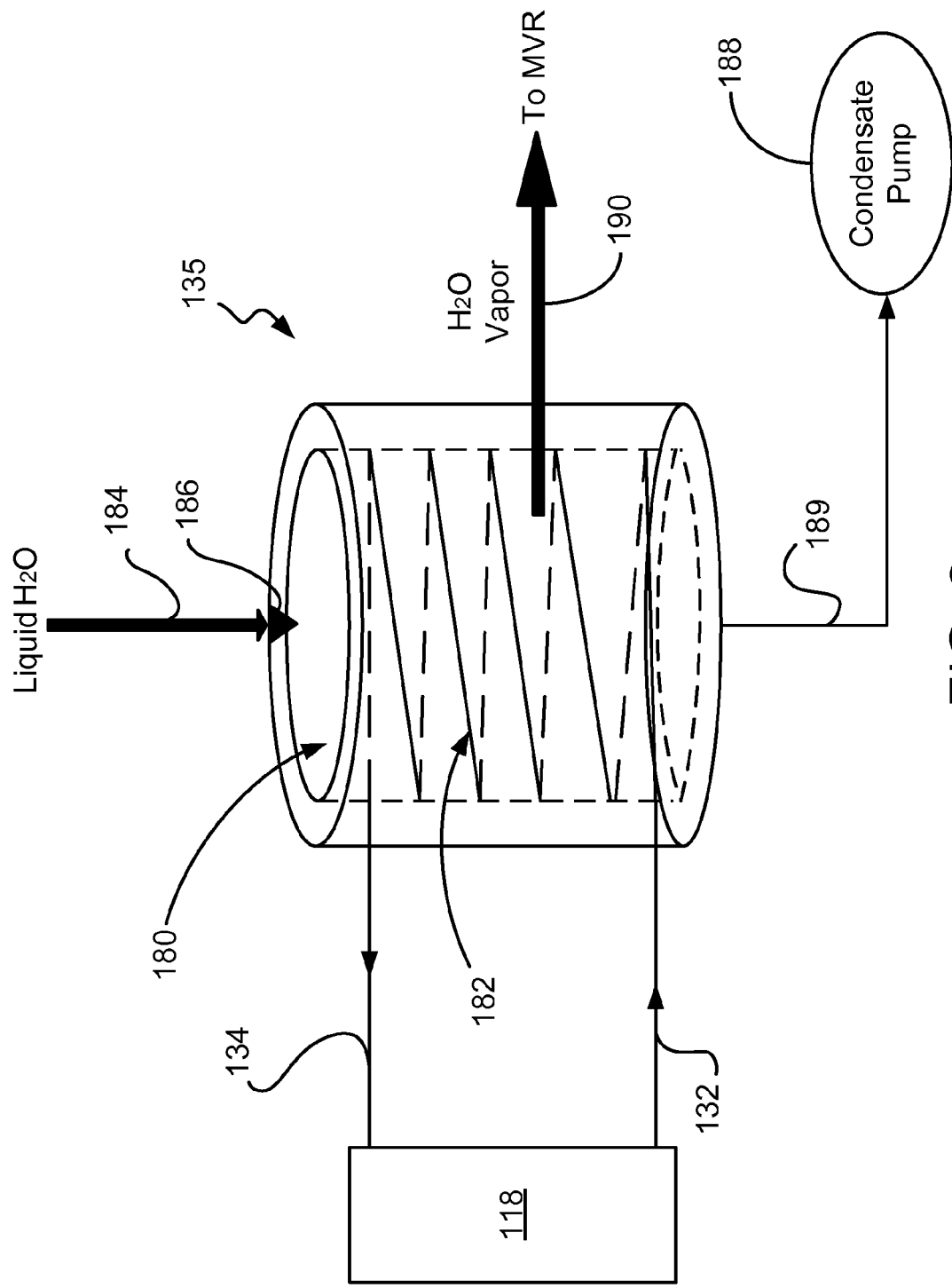
FIG. 2 is a schematic diagram of a portion of a low-grade heat recovery and conveyance system compatible with the energy recovery system of FIG. 1, which includes an embodiment of a vaporizer.

Additional details regarding features of certain embodiments of the energy recovery system 100 will now be provided. FIG. 2 schematically illustrates the cooling system 118 of the internal combustion engine 112 coupled with an embodiment of the vaporizer 135 via the pathways 132, 134. The illustrated vaporizer 135 comprises a variable pressure chamber 180 and a heat-exchanging pathway 182. The variable pressure chamber 180 can provide an environment having a relatively low or reduced pressure. For example, in some embodiments, the variable pressure chamber 180 is maintained at a pressure that is, or within a range of pressures that are, at or less than atmospheric. The heat-exchanging pathway 182 may be positioned within the variable pressure chamber 180 or otherwise positioned so as to contact liquid water and/or water vapor (i.e., fluidized water) that passes through the variable pressure chamber 180. For example, in some embodiments, the vaporizer 135 may comprise one or more chambers in addition to the variable pressure chamber 180 through which at least a portion of the heat-exchanging pathway 182 may pass. The heat-exchanging pathway 182 can be connected at input and output ends thereof with the output and input pathways 132, 134, respectively, of the cooling system 118. The heat-exchanging pathway 182 can comprise any suitable arrangement for efficiently transferring heat from coolant flowing therein to its surrounding environment (e.g., to the variable pressure chamber 180), while maintaining the coolant separate from the contents of the variable pressure chamber 180. For example, in the illustrated embodiment, the heat-exchanging pathway 182 and the variable pressure chamber 180 are arranged substantially in a shell-and-tube heat exchanger configuration. Any suitable configuration of the heat-exchanging pathway 182 and the variable pressure chamber is also contemplated, such as, for example, a plate heat exchanger configuration.

As shown at arrow 184, the vaporizer 135 can be provided with a supply of liquid water. In various embodiments, the water supply can comprise pressurized deionoized or distilled water. The water can be introduced into the variable pressure chamber 180 via an atomizer nozzle 186, which can facilitate vaporization of the liquid water.

The vaporizer 135 can further include a condensate pump 188 that is configured to remove condensed water from the variable pressure chamber 180 via a pathway 189. As shown at arrow 190, vaporized water can be removed from the variable pressure chamber 180 and transferred to the mechanical vapor recompressor 137.

When the vaporizer 135 is in operation, heated coolant fluid can flow from the cooling system 118, through the output pathway 132, through the heat-exchanging pathway 182 within the variable pressure chamber 180, and then back to the cooling system 118 through the input pathway 134. The coolant fluid thus can provide heat to the variable pressure chamber 180 and the contents thereof such that the coolant fluid returns to the cooling system 118 with a reduced thermal load. As used herein, the term "fluid" and derivatives thereof are broad terms that can include both liquids and gases. In many embodiments, the coolant fluid is in liquid form throughout its movement through the pathways 132, 182, 134. The variable pressure chamber 180 can be maintained at a pressure (or within a pressure range) that is substantially lower than the vaporization pressure of water that is at the elevated temperature within the variable pressure chamber 180. Accordingly, when the pressurized water is atomized and enters the variable pressure chamber 180, it readily vaporizes.

Vaporization of the water removes heat energy from the coolant, and this energy is stored in the water vapor as latent heat, in certain arrangements. In particular, water that is introduced into the variable pressure chamber 180 in liquid form can withdraw sensible heat from the coolant so as to undergo a change of state. As a result, a given mass of liquid water can withdraw more heat from the coolant than it would if it were already in a vaporized state prior to entering the variable pressure chamber 180. The amount of water that is vaporized in the variable pressure chamber 180 and that is ultimately delivered to the hydrogen processor 150 thus may be smaller than if vaporized water were used solely to undergo a sensible heat change when removing sensible heat from the coolant. For some hydrogen processors 150, this smaller mass of water may be desirable for proper operation. Other hydrogen processors 150 may operate better with a larger mass of water, thus pre-vaporized water may also be introduced into the variable pressure chamber 180 in a desired amount, in some instances.

The latent heat energy that is stored in the water vapor can be readily transmitted to other parts of the energy recovery system 100 simply by relocating the water vapor, as further discussed below. Moreover, with the water in vapor form, energy can be imparted to the water so as to yield a sensible heat increase, such as via compression and/or via an air-to-air heat exchanger that contains a heated gas or gas mixture (also discussed further below). As indicated at arrow 190, the water vapor can be transferred from the vaporizer 135 to the mechanical vapor recompressor 137.

Figure 3:
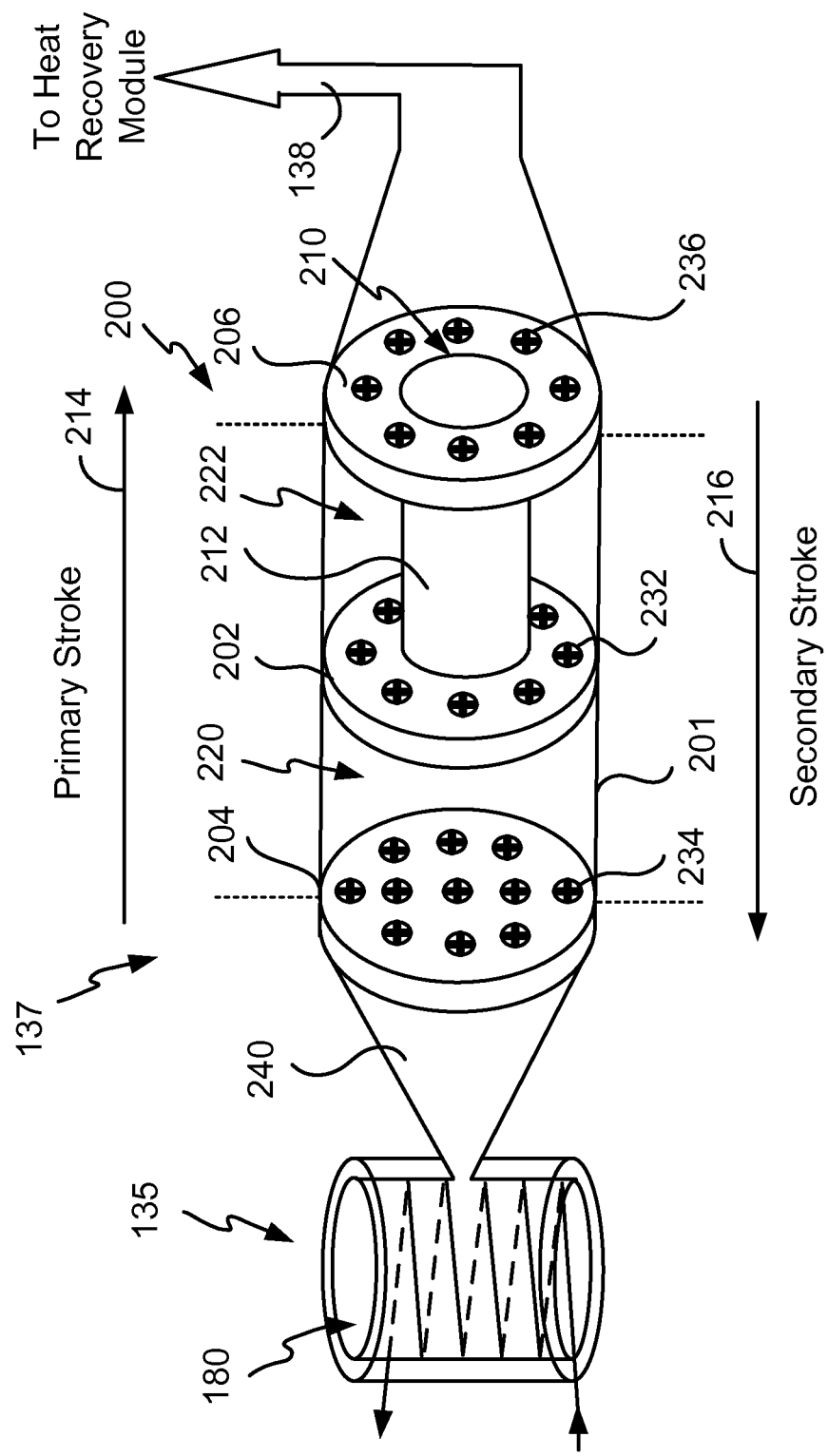
FIG. 3 is a schematic diagram of another portion of a low-grade heat recovery and conveyance system compatible with the energy recovery system of FIG. 1 that includes a partial cutaway view of an embodiment of a mechanical vapor recompressor.

FIG. 3 schematically illustrates the vaporizer 135 coupled with an embodiment of the mechanical vapor recompressor 137. The portion of the mechanical vapor recompressor 137 that is between the dashed vertical lines (which indicate end-of-stroke positions) is shown in a cutaway perspective view.

Within this region, the illustrated mechanical vapor recompressor 137 comprises a water vapor transporter 200, which can include a tube 201 or other hollow structure. The tube 201 may be insulated so as to prevent heat losses when the transporter 200 is in use. A movable piston 202 can be positioned within the tube 201, and can be constrained to translate (e.g., reciprocate) between a distal end cap 204 and a proximal end cap 206 that are attached to the tube 201 in any suitable manner. The distal end cap 204 can be at a distal end-of-stroke position of the piston 202 and the proximal end cap 206 can be at a proximal end-of-stroke position of the piston 202. The proximal end cap 206 can define an opening 210 through which a drive shaft or connecting rod 212 can pass. In some embodiments, the piston 202 is in sliding, fluid-tight engagement with the interior surface of the tube 201, and/or the connecting rod 212 is in sliding, fluid-tight engagement with the proximal end cap 206. The connecting rod 212 can move the piston 202 reciprocally within the tube 201. In particular, as shown at arrow 214, the connecting rod 212 can move the piston 202 in a proximal direction from the distal end cap 204 to the proximal end cap 206 to achieve a primary stroke, and as shown at arrow 216, the connecting rod 212 can move the piston 202 in a distal direction from the proximal end cap 206 to the distal end cap 204 to achieve a secondary stroke.

The piston 202 can divide the volume of space that is within the tube 201 between the end caps 204, 206 into a distal chamber 220 and a proximal chamber 222. The size of the chambers 220, 222 is variable and changes with movement of the piston 202. In particular, the size of the distal chamber 220 increases during a primary stroke and decreases during a secondary stroke, whereas the size of the proximal chamber 222 decreases during a primary stroke and increases during a secondary stroke.

The distal end cap 204 can comprise one or more one-way valves 234, the piston 202 can comprise one or more one-way valves 232, and the proximal end cap 206 can comprise one or more one-way valves 236. The one-way valves 232, 234, 236 can be configured to permit fluids to pass through them in a single direction and to prevent fluids from passing through them in the opposite direction. For example, the one-way valves 232, 234, 236 can comprise reed valves and/or check valves. The one-way valves 232, 234, 236 may each comprise the same variety of valve, or different valves may be used. For example, in some embodiments, reed valves may be used for the one-way valves 232, 234, but check valves that are configured to open only when a predetermined or desired pressure within the proximal volume 222 is achieved may be used for the one-way valves 236. Proximally located check valves can, in some cases, provide for a more controlled and/or more consistent pressure (and temperature), and/or a narrower pressure range (and temperature range), of water vapor that exits the mechanical vapor recompressor 137.

The mechanical vapor recompressor 137 can be coupled with the variable pressure chamber 180 of the vaporizer 135 via a pathway 240. Accordingly, the variable pressure chamber 180 can be in selective fluid communication with the distal chamber 220—that is, the variable pressure chamber 180 and the distal chamber 220 are in fluid communication with each other when the one-way valves 234 are open, but are not in fluid communication with each other when the one-way valves 234 are closed. Additionally, as previously mentioned, the mechanical vapor recompressor 137 can provide a feedstock stream of heated steam to the heat recovery module 140 via the pathway 138. Accordingly, the proximal chamber 222 can be in selective fluid communication with the heat recovery module 140—that is, the proximal chamber 222 and the heat recovery module 140 are in fluid communication with each other when the one-way valves 236 are open, but are not in fluid communication with each other when the one-way valves 236 are closed.

When the vaporizer 135 and the mechanical vapor recompressor 137 are in operation, the mechanical vapor recompressor 137 can maintain a low-pressure environment within the variable pressure chamber 180. In particular, as water entering the variable pressure chamber 180 is vaporized, it expands, which may thereby potentially increase the pressure within the variable pressure chamber 180 and, likewise, within the pathway 240. As the piston 202 is moved from the distal end-of-stroke position to the proximal end-of-stroke position (i.e., during a first primary stroke), the volume of the distal chamber 220 expands. This creates a negative pressure within the distal chamber 220, which can result in the one-way valves 234 opening to permit water vapor to pass through them and thereby reduce the pressure within the variable pressure chamber 180. When the piston 202 reaches the proximal end-of-stroke position, the distal chamber 220 contains water vapor therein at pressure that is approximately equal to an operating pressure of the variable pressure chamber 240.

As the piston 202 is moved from the proximal end-of-stroke position to the distal end-of-stroke position (i.e., during a secondary stroke), the volume of the distal chamber 220 decreases. Some of the water vapor is initially permitted to pass through the one-way valves 232 of the piston 202 into the proximal chamber 222, whereas the distal one-way valves 234 prevent water vapor from exiting the distal chamber 220 through them. Since the total surface area of the one-way valves 232 through which the water vapor is permitted to pass is less than the surface area of the piston 202, the water vapor that remains within the distal chamber 220 is compressed. As a result, the pressure and temperature of the water vapor within the chamber 220 continuously increases as the piston 202 is moved to the distal end-of-stroke position. When the piston 202 ultimately reaches the distal end-of-stroke position, substantially all of the water vapor has passed through the one-way valves 232 into the proximal chamber 222. Accordingly, during the secondary stroke, the volume of the proximal chamber 222 increases and is filled with the heated water vapor.

As the piston 202 is again moved from the distal end-of-stroke position to the proximal end-of-stroke position (i.e., during a second primary stroke), some of the heated water vapor is permitted to pass through the proximal one-way valves 236 of the end cap 206 into the pathway 138, whereas the one-way valves 232 of the piston 202 prevent water vapor from exiting the proximal chamber 222 through them. Since the total surface area of the one-way valves 236 through which the water vapor is permitted to pass is less than the surface area of the end cap 206, the water vapor that remains within the proximal chamber 222 is compressed. As a result, the pressure of the water vapor within the chamber 222 continuously increases, and the temperature increases to even greater levels, as the piston 202 is moved to the proximal end-of-stroke position. When the piston 202 ultimately reaches the proximal end-of-stroke position, substantially all of the water vapor has passed through the one-way valves 236 into the pathway 138.

During the second primary stroke just described, the distal chamber 220 is filled with water vapor from the variable pressure chamber 180 in the same manner described above with respect to the first primary stroke. In some embodiments, it can be desirable for water to remain in the vapor state at least until it has entered the distal chamber 220. Thereafter, any latent energy that may be lost from water vapor if it condenses can remain within the water vapor transporter 200, or can eventually be moved downstream, since the processes within the transporter 200 can be substantially adiabatic. Operation of the water vapor transporter 200 in the foregoing manner can be referred to as dual-action piston movement.

As can be seen from the foregoing discussion, in certain embodiments, the mechanical vapor recompressor 137 can provide the variable pressure chamber 180 with a relatively low-pressure environment and can also heat and pressurize water vapor extracted from the variable pressure chamber. In some instances, the mechanical vapor recompressor 137 can maintain the pressure within the variable pressure chamber 180 at or below a threshold level. Pressures that are at or below the threshold level may be well suited for vaporization of water. For example, in some embodiments, the mechanical vapor recompressor 137 can maintain the pressure within the chamber 180 at or below atmospheric pressure. Other arrangements of the mechanical vapor recompressor 137 are also possible.

Figure 4:
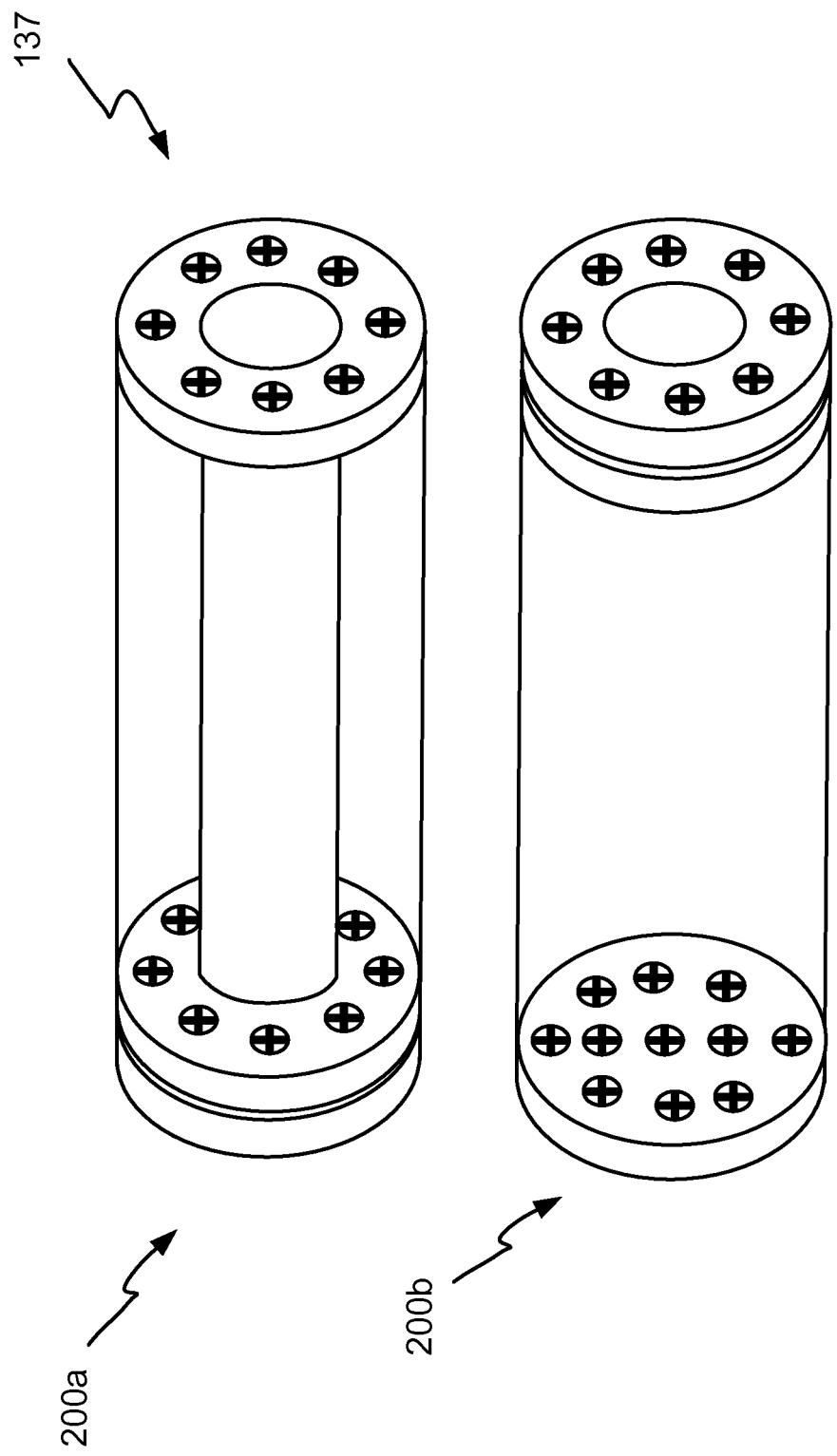
FIG. 4 is a perspective view of a portion of another embodiment of a mechanical vapor recompressor.

For example, as shown in FIG. 4, in some embodiments, a mechanical vapor recompressor 137 can comprise multiple water vapor transporters 200 that operate in parallel. In the illustrated embodiment, two water vapor transporters 200a, 200b operate simultaneously at a 180 degree offset relative to each other. For example, in the illustrated snapshot of operation, the transporter 200a is at the beginning of an initial primary stroke, whereas the transporter 200b is at the beginning of an initial secondary stroke. Other embodiments can comprise three or more transporters 200, four or more transporters 200, five or more transporters 200, etc. In some embodiments, the use of multiple transporters 200 in parallel can maintain a more consistent pressure level within the variable pressure chamber 180 and/or can provide a more consistent pressure level and temperature of water vapor exiting the mechanical vapor recompressor. For example, four transporters 200 can be operated at 90 degree offsets to reduce pressure pulsing at the input end and the output end of a mechanical vapor recompressor 137.

Figure 5:
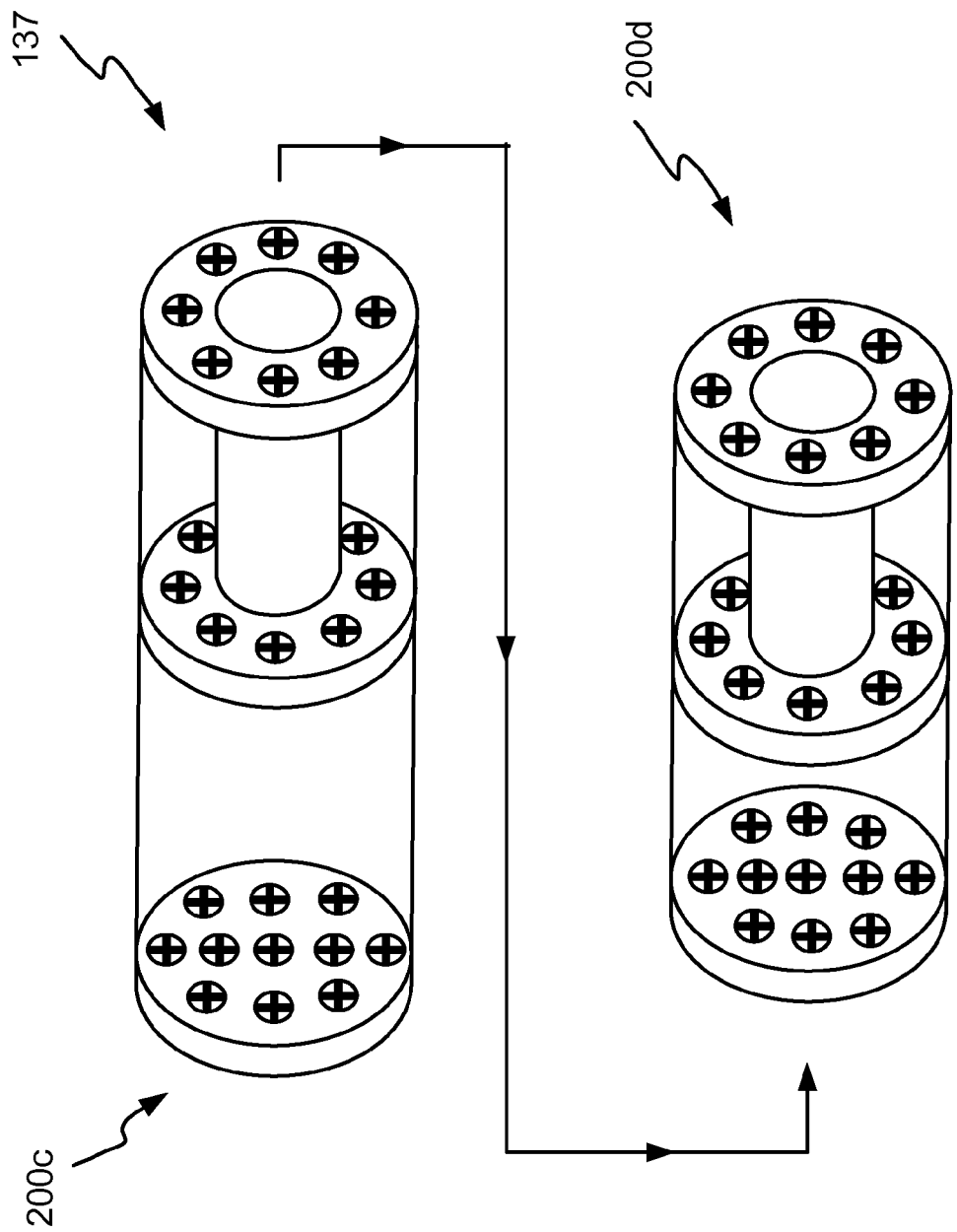
FIG. 5 is a perspective view of a portion of another embodiment of a mechanical vapor recompressor.

As shown in FIG. 5, in other or further embodiments, water vapor transporters 200 can be operated in series. In the illustrated embodiment of a mechanical vapor recompressor 137, the output from a first water vapor transporter 200c can be supplied as the input to a second water vapor transporter 200d. The internal volume of the second transporter 200d is smaller than that of the first transporter 200c, which can result in higher pressures and temperatures than could be achieved by the first transporter 200c alone. Other embodiments can comprise three or more transporters 200, four or more transporters 200, five or more transporters 200, etc. In some embodiments, the use of multiple transporters 200 in series can assist in achieving a desired operational pressure or operational temperature at the output of a mechanical vapor recompressor 137. The transporters 200 may define sequentially smaller volumes. Any suitable combination of transporters 200 operating in series and/or in parallel is possible to achieve the desired ranges and values of the temperature and the pressure of water vapor exiting a mechanical vapor recompressor 137.

In view of the foregoing, both the operational parameters and arrangements of the vaporizer 135 and of the mechanical vapor recompressor 137 can be selected, adjusted, or otherwise designed to ultimately provide the proper amount of water vapor to the hydrogen processor 150 at the desired temperature and pressure. As further discussed below, additional heating of the water vapor can take place in the heat recovery module 140 such that the temperature of the water vapor as it leaves the mechanical vapor recompressor 137 may be lower than the desired operational temperature for the hydrogen processor 150.

Other arrangements of mechanical vapor recompressors 137 are also possible, and may comprise any suitable variety of vacuum pump. For example, in some embodiments, the mechanical vapor recompressor 137 can comprise a liquid ring vacuum pump, such as the Titan 40 horsepower single-stage liquid ring vacuum pump, Model No. DV0550B-KA, which is available from Dekker Vacuum Technologies, Inc. of Michigan City, Ind.

Figure 6:
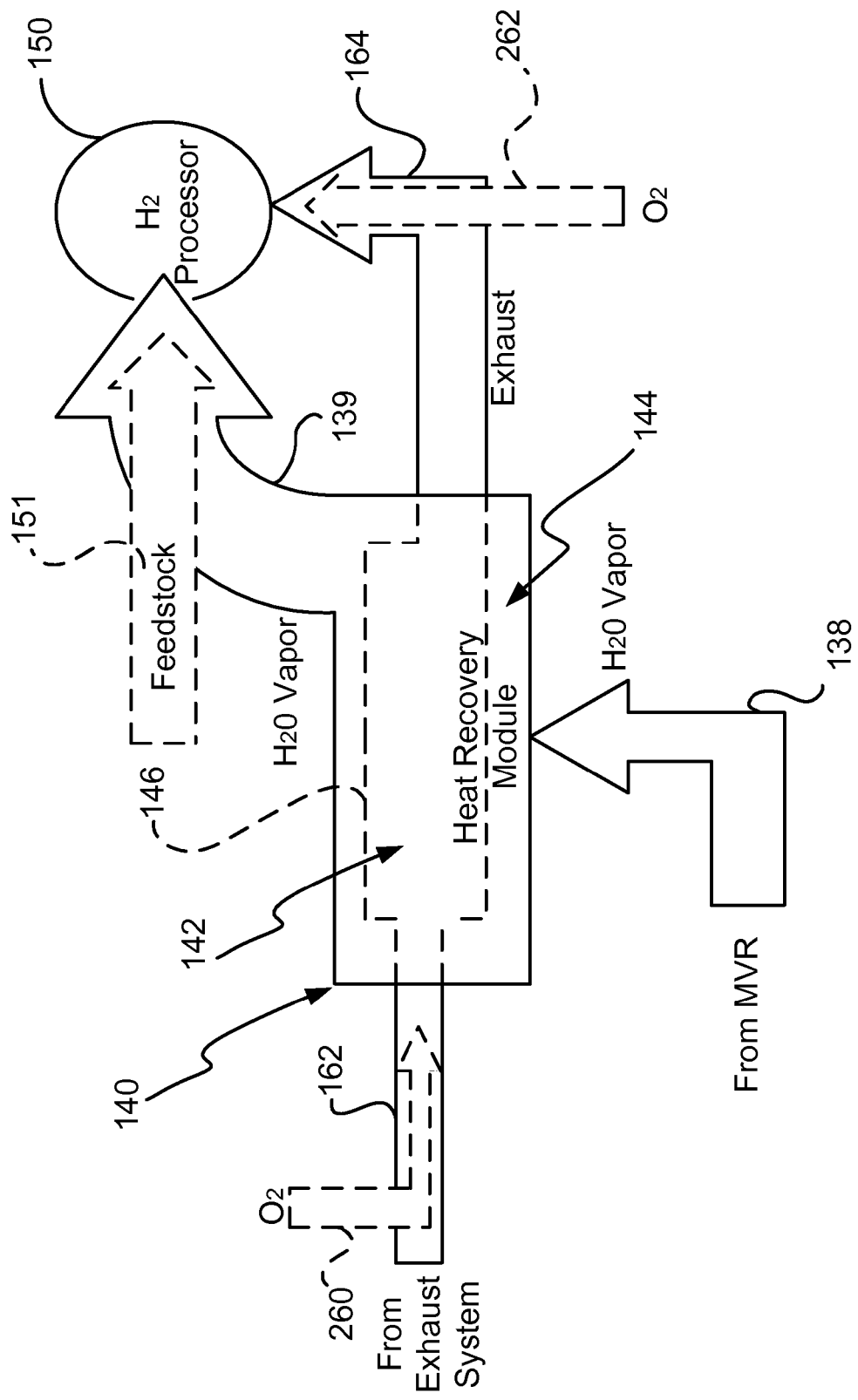
FIG. 6 is a schematic diagram of another portion of the energy recovery system of FIG. 1.

FIG. 6 schematically illustrates heated and pressurized water vapor from the mechanical vapor recompressor 137 being introduced into the environment 144 of the heat recovery module 140 via the pathway 138. As previously mentioned, since the water vapor has previously sustained a phase change into the vapor state, it can sustain a sensible heat change within the heat recovery module 140. Heating of the water vapor can be provided by the exhaust that is expelled from the exhaust system 116. In particular, the exhaust and the water vapor thermally interact with each other within the heat recovery module 140. As previously mentioned, the thermal interaction may occur via any suitable thermal interface 146, such as an air-to-air heat exchanger, such that the exhaust and the water vapor remain physically separated from each other during the heat exchange. Once the water vapor has been heated to the desired level, it can be introduced into the hydrogen processor 150 via the pathway 139.

As previously discussed, in the embodiment shown in FIG. 1, the hydrogen processor 150 comprises a catalytic steam reformer that operates on a feedstock 151 (e.g., methane). Any suitable catalytic steam reformer may be used, such as, for example, compact membrane reactors. Certain of such reactors are configured for operation at temperatures from about 200 degrees Celsius to about 450 degrees Celsius, with a maximum pressure of about 300 psi at 350 degrees Celsius. Others are configured for operation at temperatures from about 200 degrees Celsius to about 700 degrees Celsius, with a maximum pressure of about 350 psi at 400 degrees Celsius.

With continued reference to FIG. 6, the feedstock 151 is shown in dashed lines to indicate its optional nature. For example, the feedstock 151 can be omitted in some embodiments, such as embodiments in which the hydrogen processor 150 employs high-temperature electrolysis rather than catalytic steam reformation.

FIG. 6 also shows injection streams 260 and 262 in dashed arrows to indicate optional points at which oxygen can be introduced into the hot exhaust to increase its temperature. For example, oxygen can be injected into the exhaust pathway 162 via the injection stream 260 if the hydrogen processor 150 is configured to operate on water vapor that is at a relatively high temperature. In other or further embodiments, oxygen can be injected into the exhaust pathway 164 via the injection stream 262 if relatively high process temperatures are employed by the hydrogen processor 150.

As can be appreciated from the foregoing description, numerous configurations are possible for the energy recovery system 100. For example, different internal combustion engines 112 may be used in different embodiments, which can result in different amounts of heat being expelled from the engines 112 via the respective exhaust systems 116 and cooling systems 118. Similarly, different hydrogen processors 150 may be employed that operate at different temperatures and/or with different inputs. Accordingly, various components and operational parameters of the energy recovery system 100 can be adjusted for optimal performance of the system 100.

Provided hereafter are illustrative examples of various energy recovery systems 100 and their associated operational parameters. The specific examples are not intended to limit the present disclosure, although the details recited with respect to the specific examples may include patentable subject matter.

Example 1

With reference again to FIG. 1, in one embodiment, the internal combustion engine 112 used in an embodiment of the energy recovery system 100 comprises an Olympian natural gas electrical generator set, Model No. G17.5UH3S, which is available from Caterpillar Inc. of Peoria, Ill. The engine 112 consumes 326 cubic feet of natural gas fuel per hour, with each cubic foot of natural gas containing approximately 986 BTUs, such that the engine 112 converts energy contained within the natural gas at a rate of 94.2 kilowatts. The following table identifies the energy forms into which the combusted natural gas is converted, and the efficiency of the energy recovery system 100 as compared with the engine 112 alone.

TABLE 1

| Energy Form | Rate of Energy Conversion (kilowatts) | Rate of Energy Conversion (BTU/hour) | Percentage of Total Energy Converted [Wasted Energy Shown in Brackets] | Percentage of Energy Recaptured by the System 100 | Percentage of Total Energy Recaptured by the System 100 |
|---|---|---|---|---|---|
| Electricity | 17.5 | 59,728 | 19% | 100% | 19% |
| Efficiency Losses | 3.5 | 11,946 | [4%] | 0% | 0% |
| Heat Dissipation to Environment | 13.9 | 47,400 | [15%] | 50% | 7% |
| Heating of Liquid Coolant | 27.5 | 93,840 | [29%] | 85% | 25% |
| Heated Exhaust | 31.8 | 108,523 | [34%] | 85% | 29% |
| TOTAL | 94.2 | 321,437 | 100% | N/A | 79% |

As can be seen from Table 1 (see column 4), the internal combustion engine 112 is only about 19% efficient in energy recovery by means of electrical generation when it operates alone. In contrast, the energy recovery system 100 is able to recover energy from the otherwise wasted heat such that the overall recovery is about 80%. In other embodiments, the overall recovery of the system 100 can be within a range of from about 60% to about 90%, from about 65% to about 85%, or from about 70% to about 80%, or can be no less than about 60%, no less than about 65%, no less than about 70%, no less than about 75%, no less than about 80%, no less than about 85%, or no less than about 90%.

As shown in Table 1, it is possible to recover about 85% of the heat that is carried away from the engine 112 via the liquid coolant. In particular, heat can be removed from the liquid coolant to vaporize water within the vaporizer 135. With reference to FIG. 3, in order to provide a low-pressure environment within the pressure chamber 180, the mechanical vapor recompressor 137 can be configured to continuously remove substantially all of the vaporized water from the pressure chamber 180. Based on the information in Table 1, it is possible to calculate the volume of steam that is to be removed from the variable pressure chamber 180 as follows:

(93,900 BTU load/hour)/(960 BTU/lb $H_2O$ required for vaporization)=97.8 lb/hour of vaporized $H_2O$=1.63 lb/minute of vaporized $H_2O$.

Each pound of steam occupies a volume of 25.8 cubic feet at atmospheric pressure. Accordingly, the rate at which steam can be removed from the variable pressure chamber 180 in order to maintain a consistent pressure within the variable pressure chamber 180 is calculated as follows:

(1.63 lb $H_2O$/minute)×(25.8 cubic feet/lb $H_2O$)=43.7 cubic feet/minute

Accordingly, the mechanical vapor recompressor 137 can operate so as to remove water vapor from the pressure chamber 180 at 43.7 cubic feet per minute. Where a single water vapor transporter 200 is used, such as that illustrated in FIG. 3, this can be accomplished, for example, when the piston 202 has a diameter of about 3.75 inches, a stroke length of about 3.75 inches, and is operated at 1800 strokes per minute. Where six water vapor transporters 200 operating in parallel with each other are used (see, e.g., FIG. 4), this can be accomplished, for example, when each piston 202 has a diameter of about 2.1 inches, a stroke length of about 2.0 inches, and is operated at 1800 strokes per minute.

As shown in Table 1, it is possible to recover about 85% of the heat that is carried away from the engine 112 via the exhaust. With reference to FIG. 1, this heat can be used for the sensible temperature increase of the vaporized water that is within the environment 144 of the heat recovery module 140, to increase the working pressure of the exhaust used in the hydrogen processor 150, and/or to increase the sensible temperature of the working environment of the hydrogen processor 150.

Example 2

In another embodiment, the internal combustion engine 112 used in the energy recovery system 100 comprises a 60 hertz hydrogen-fueled industrial generator, Model No. GGKB, which is available from Cummins of Columbus, Ind. The engine 112 consumes 4,334 cubic feet of hydrogen fuel per hour, thereby releasing 1,290,000 BTUs per hour, or 21,500 BTUs per minute. The released energy takes various forms. About 7600 BTU/min is in the form of electricity, about 5160 BTU/min is lost as heat to the exhaust stream, about 7223 BTU/min is lost as heat that is dissipated from the engine via the cooling system, and about 1517 BTU/min is lost as radiant heat.

With reference to FIG. 2, for such a system a glycerin/water cooling fluid may be channeled through the pathways 132, 182, 134 of the cooling system 118. When in the pathway 132, the cooling fluid may be at a temperature of about 240 degrees Fahrenheit. In particular, the cooling fluid may flow through the pathway 132 at a rate of 64 gallons per minute, be at a pressure of about 17 psig, and be at a temperature of about 240 degrees. The cooling fluid may lose heat to the vaporizer 135 such that the cooling fluid may be at a temperature of about 226 degrees Fahrenheit when it is within the return pathway 134 (and may also flow at 64 gallons per minute and be at a pressure of about 17 psig).

Liquid make-up water can be provided to the vaporizer 135 at a rate of about 7 pounds per minute at a pressure of 50 psig and at a temperature of 50 degrees Fahrenheit. The variable pressure chamber 180 can have a diameter of about 12 inches and a height of about 24 inches, although other arrangements are possible. After having passed through the mechanical vapor recompressor 137 (FIG. 3), the vaporized water can be at a pressure of about 104 psia and be at a temperature of about 325 degrees Fahrenheit.

With reference to FIG. 3, the mechanical vapor recompressor 137 can achieve operational parameters, such as after the piston 202 of the water vapor transporter 200 has cycled a few times. In the instant example, the pathway 240 to the mechanical vapor recompressor 137 can be maintained at a pressure of about 1 atmosphere and a temperature of about 212 degrees Fahrenheit. In a primary stroke, the distal chamber 220 can be at a pressure of about 1 atmosphere and a temperature of about 212 degrees Fahrenheit. Stated otherwise, the distal chamber 220 and the pathway 240 may be the same, or nearly the same, during a primary stroke. The proximal chamber 222 can range from a pressure of about 34 psia to about 104 psia during the primary stroke, and the temperature therein can also be increased. In a secondary stroke, the proximal chamber 222 can be at about 34 psia. The distal chamber 220 can range from a pressure of about 14 psia to about 34 psia during the secondary stroke, and the temperature therein can also be increased.

The mechanical vapor recompressor 137 can be configured to transport much or all of the 7 pounds per minute of water that is vaporized in the vaporization chamber 135. In some instances, the water vapor transporter 200 comprises a single cylinder system. The cylinder can have a diameter of about 3 inches, the piston can have a stroke length of about 2.5 inches, and the piston can cycle at 1800 strokes per minute.

The approximately 7 pounds per minute of vaporized water can be delivered from the mechanical vapor recompressor 137 to the heat recovery module 140. After leaving the module 140, the water vapor can be at a pressure of about 110 psig and a temperature of about 640 degrees Fahrenheit, having been heated by the exhaust gases from the internal combustion engine 112.

Figure 7:
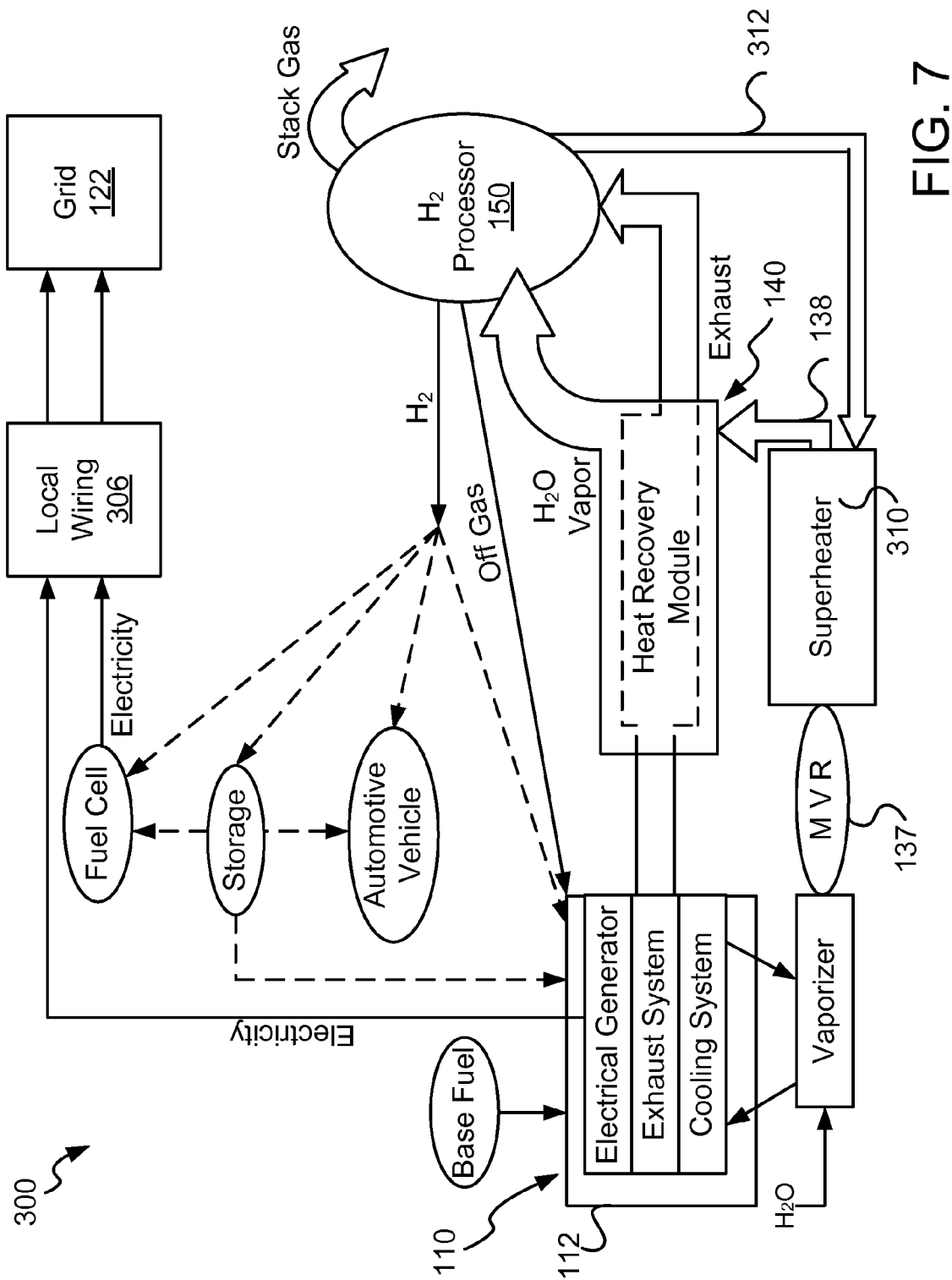
FIG. 7 is a schematic diagram of another embodiment of an energy recovery system that is configured to utilize waste heat from a base energy conversion system in the generation of hydrogen fuel.

FIG. 7 illustrates another embodiment of an energy recovery system 300, which can resemble the energy recovery system 100 described above in certain respects. Accordingly, like features are designated with like reference numerals. Relevant disclosure set forth above regarding similarly identified features thus may not be repeated hereafter. Moreover, specific features of the energy recovery system 300 may not be identified by a reference numeral in the drawings or specifically discussed in the written description that follows. However, such features may clearly be the same, or substantially the same, as features depicted in other embodiments and described with respect to such embodiments. Accordingly, the relevant descriptions of such features apply equally to the features of the energy recovery system 300. Any suitable combination of the features and variations of the same described with respect to the energy recovery system 100 and components thereof can be employed with the energy recovery system 300 and components thereof, and vice versa. This pattern of disclosure applies equally to further embodiments depicted in subsequent figures and described hereafter.

The energy recovery system 300 can include a base energy conversion system 110 that can comprise any suitable source of heat, such as, for example, internal or external combustion systems that may be used for a variety of power applications, including, for example, chemical reaction heat generation systems (e.g., boilers, industrial furnaces, or combustion engines), nuclear powered heat generation systems, heat transfer or change-of-state systems (e.g., refrigeration systems or cooling towers), and/or systems configured to capture naturally occurring environmental energy. Such systems can provide one or more forms of heat that can be used in the ultimate production of hydrogen, including high-grade heat (e.g., in exhaust or high-temperature steam), mid-grade heat (e.g., in mid-temperature steam or other media), and/or low-grade heat (e.g., in coolant fluids). Stated otherwise, the base energy conversion systems 110 may be operated on any suitable scale, whether residentially or on an industrial scale. In the illustrated embodiment, the base energy conversion system 110 comprises an internal combustion engine 112 of a suitable size for a residence or small business.

The energy recovery system 300 may be able to satisfy many or all of the electrical needs of the residence or business, and thus may be electrically connected with the local wiring 306 of the residence or business. In some embodiments, the energy recovery system 300 may produce excess electrical energy, which can be sold to the grid 122.

The illustrated embodiment of the energy recovery system 300 can include a superheater 310 that is configured to convert waste heat from a hydrogen processor 150 into additional steam feedstock that can be cycled back to the hydrogen processor 150. Depending on the application, the superheater 310 can be positioned before or after a heat recovery module 140. In the illustrated embodiment, the superheater 310 is positioned to receive heated steam from a mechanical vapor recompressor 137 and to deliver steam to the heat recovery module 140 via a pathway 138. The superheater 310 can receive waste heat energy from a hydrogen processor 150 via a pathway 312. Liquid water may be provided directly to the superheater 310 to be converted into additional steam.

Figure 8:
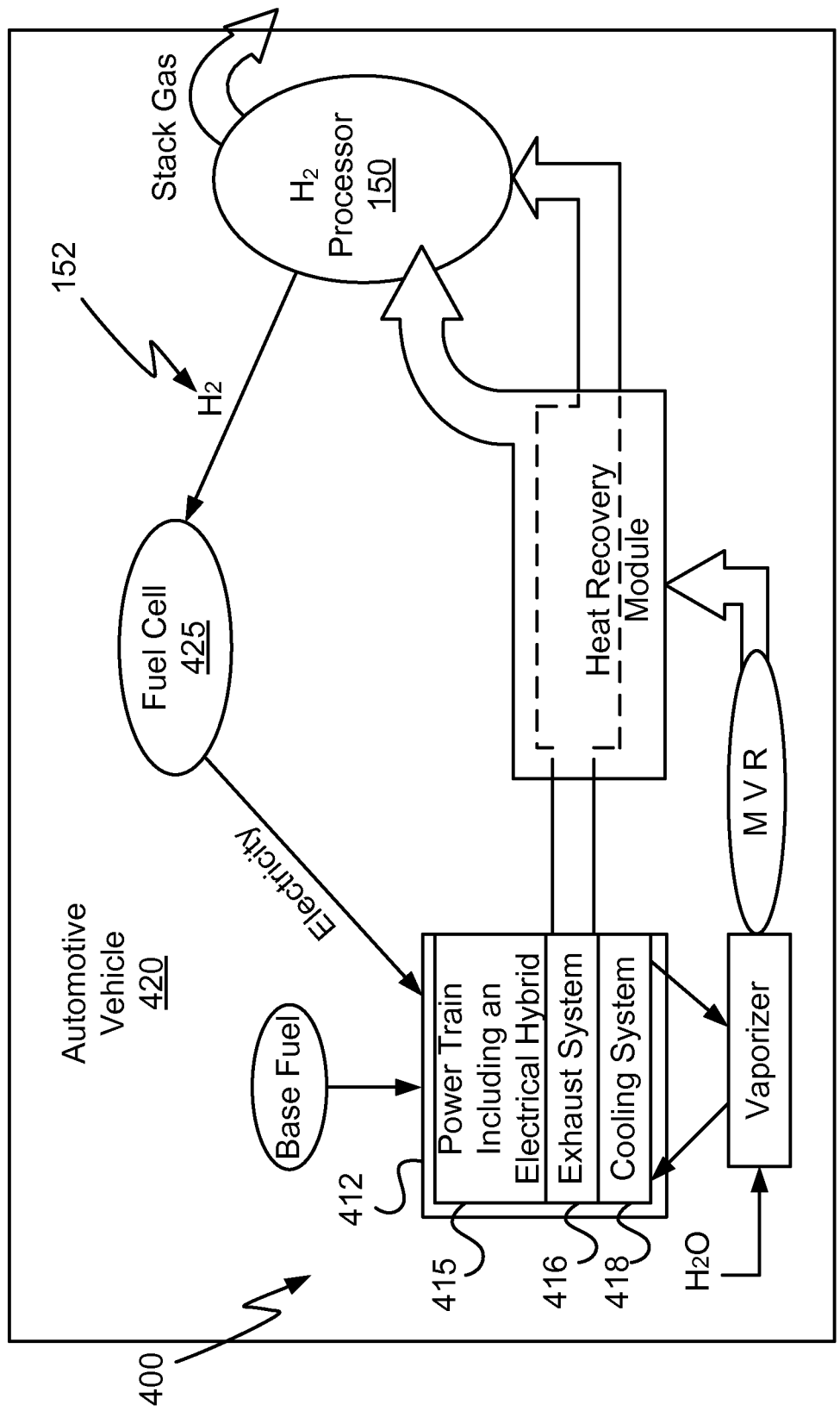
FIG. 8 is a schematic diagram of an embodiment of an energy recovery system that is configured to utilize waste heat from a base energy conversion system in the generation of hydrogen fuel, and that is contained onboard an automotive vehicle.

FIG. 8 illustrates another embodiment of an energy recovery system 400, which can resemble the energy recovery systems 100, 300 described above in certain respects. The energy recovery system 400 can be situated onboard an automotive vehicle 420. In some embodiments, the automotive vehicle 420 includes an internal combustion engine 412 that can run on any suitable fuel (e.g., gasoline, diesel, or hydrogen). Energy can be removed from the internal combustion engine 412 via a power train including an electrical hybrid 415, an exhaust system 416, and an engine cooling system 418

The automotive vehicle 420 can further include a fuel cell 425 configured to convert purified hydrogen 152 into electrical energy, which may be stored or may be used directly. Accordingly, the automotive vehicle 420 can be a highly efficient hybrid vehicle.

Figure 9:
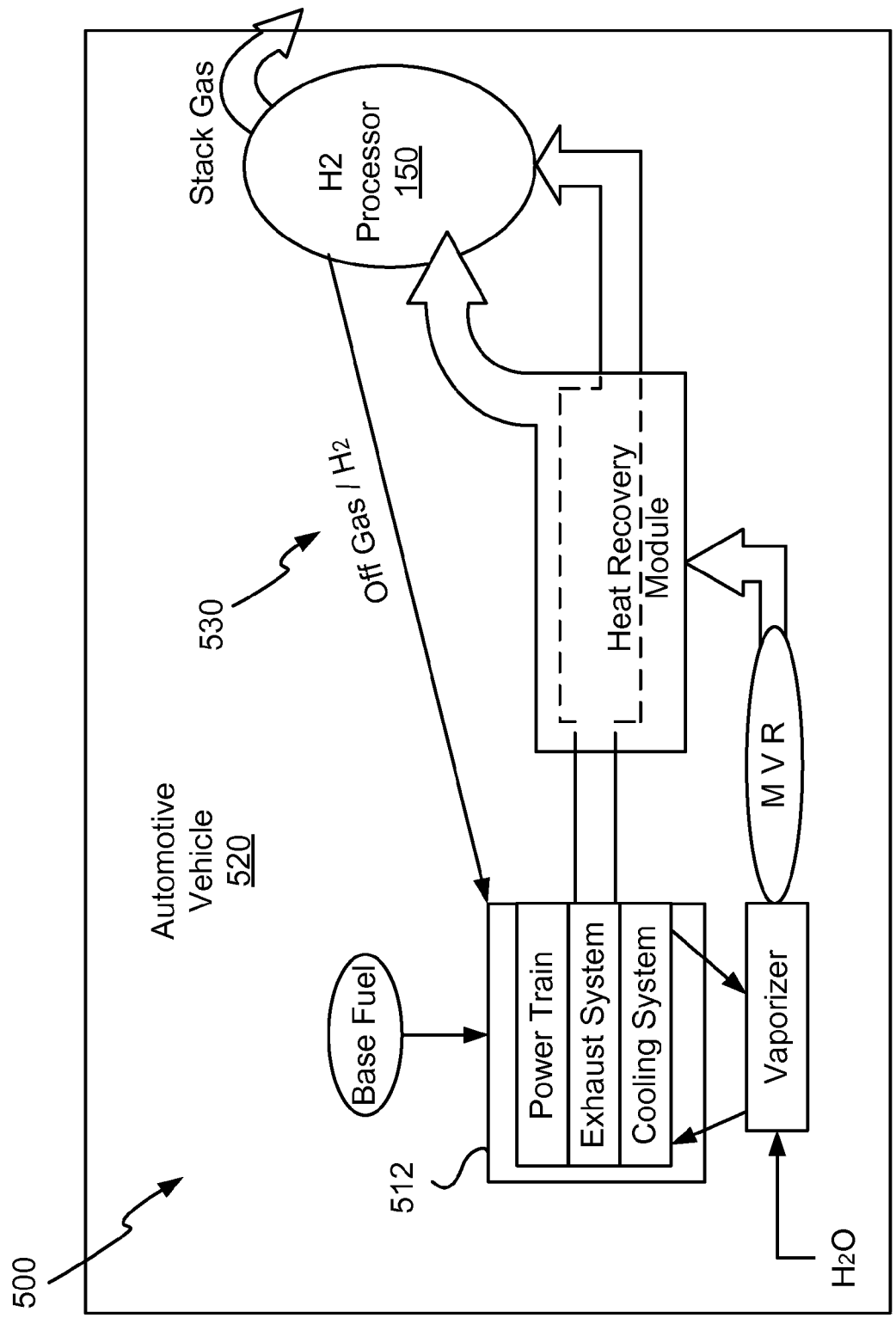
FIG. 9 is a schematic diagram of another embodiment of an energy recovery system that is configured to utilize waste heat from a base energy conversion system in the generation of hydrogen fuel, and that is contained onboard an automotive vehicle.

FIG. 9 illustrates another embodiment of an energy recovery system 500 that is located onboard an automotive vehicle 520. The vehicle 520 includes an internal combustion engine 512 that can be fueled by hydrogen and other energetic gases. The vehicle 520 can include a hydrogen processor 150 that need not necessarily produce highly purified hydrogen. Accordingly, hydrogen and off gases 530 produced in the hydrogen processor 150 can be delivered as fuel to the internal combustion engine 512.

Figure 10:
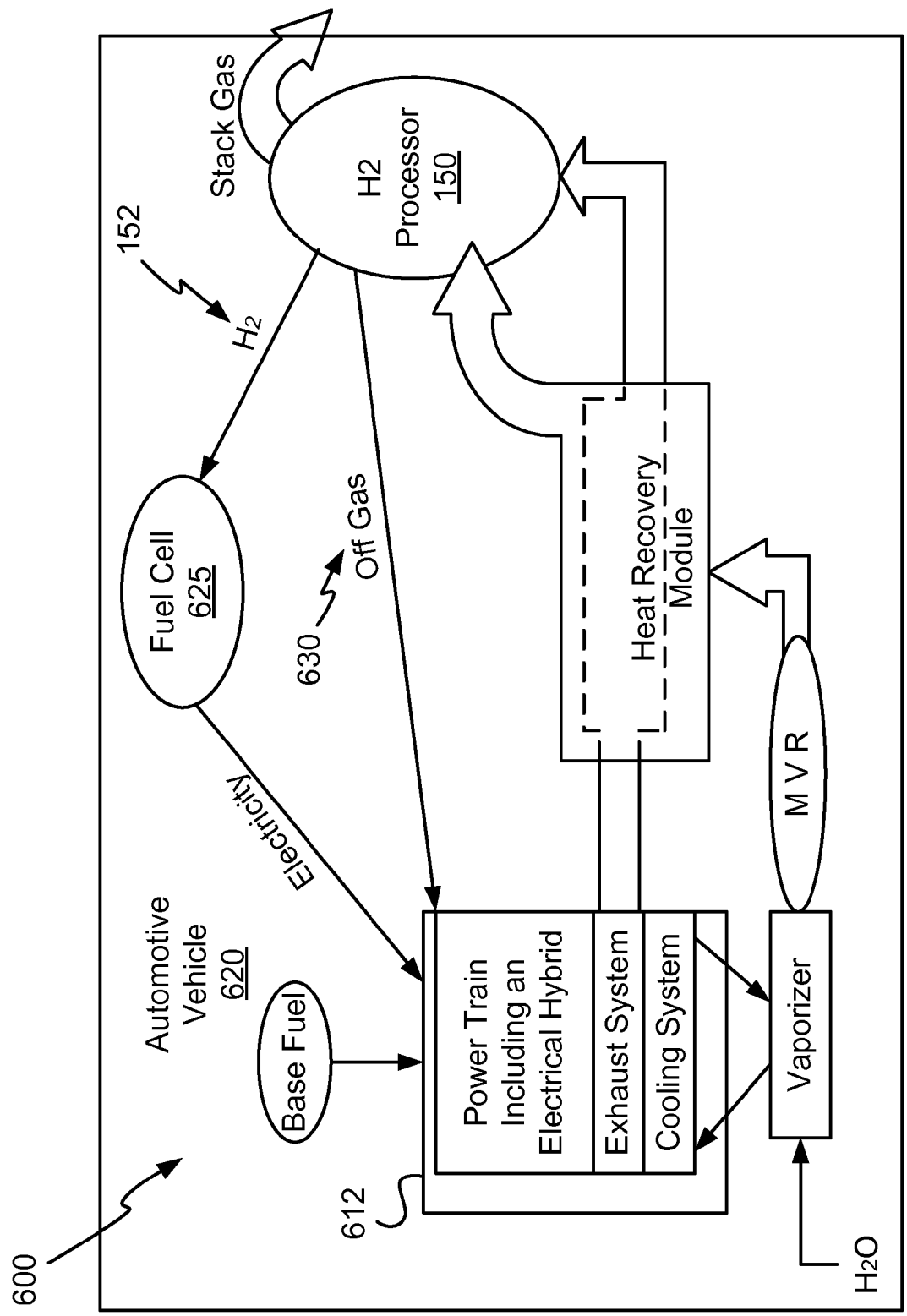
FIG. 10 is a schematic diagram of still another embodiment of an energy recovery system that is configured to utilize waste heat from a base energy conversion system in the generation of hydrogen fuel, and that is contained onboard an automotive vehicle.

FIG. 10 illustrates another embodiment of an energy recovery system 600 that is located onboard an automotive vehicle 620. The vehicle 620 includes an internal combustion engine 612 that can be fueled by hydrogen and other energetic gases. Accordingly, off gas 630 generated by a hydrogen processor 150 can be used as fuel. The vehicle 620 further includes a fuel cell 625 that is configured to operate using purified hydrogen 152. The automotive vehicle 620 thus can efficiently utilize products and co-products of the hydrogen processor 150 so as to be a highly efficient hybrid vehicle.

Figure 11:
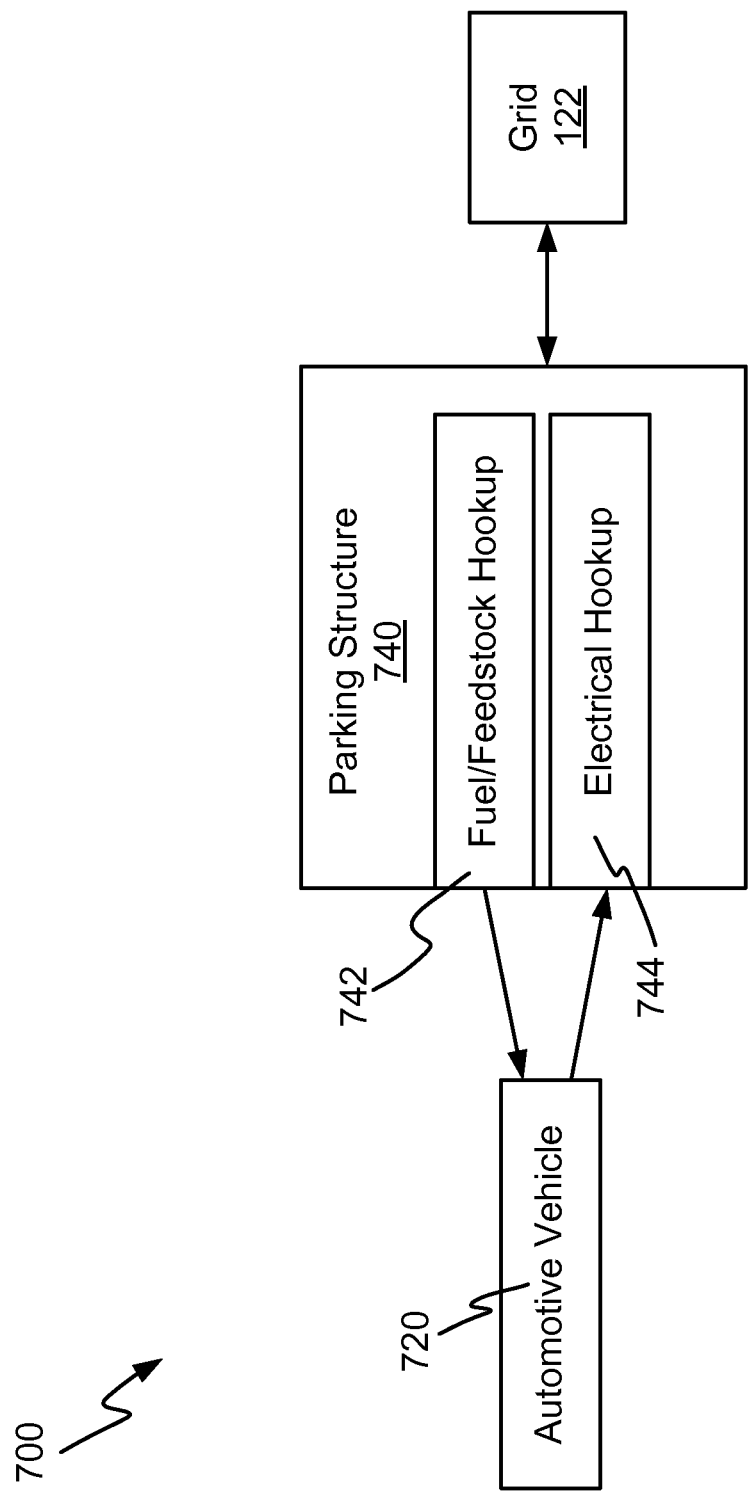
FIG. 11 is a schematic diagram of a fueling system that is compatible with embodiments of the systems of FIGS. 8-10.

FIG. 11 illustrates an embodiment of a fueling system 700 configured for use with an automotive vehicle 720 such as any of the automotive vehicles 420, 520, 620 just described. The system 700 can include a parking structure 740, which can be situated at a residence (e.g., a garage), a business establishment (e.g., a commercial parking structure), a fuel station, or any other suitable parking site at which an automotive vehicle may be stationed for a sustained period. The parking structure 740 can include a fuel/feedstock hookup 742 (e.g., connection to a natural gas line, a water line, and/or any other suitable input) and an electrical hookup 744 (e.g., a standard A/C connector).

When the vehicle 720 is parked, it can be connected to each of the fuel/feedstock hookup 742 and the electrical hookup 744. Its internal combustion engine can be left running while the vehicle 720 is parked so as to continue producing usable energy efficiently. The vehicle 720 can provide electricity to the parking structure 740, and may even produce sufficient electricity such that a surplus may be delivered to the grid 122. In further embodiments, the parking structure 740 may include multiple sets of fuel/feedstock and electrical hookups 742, 744 at which multiple vehicles 720 may simultaneously produce electrical energy while parked.

Figure 12:
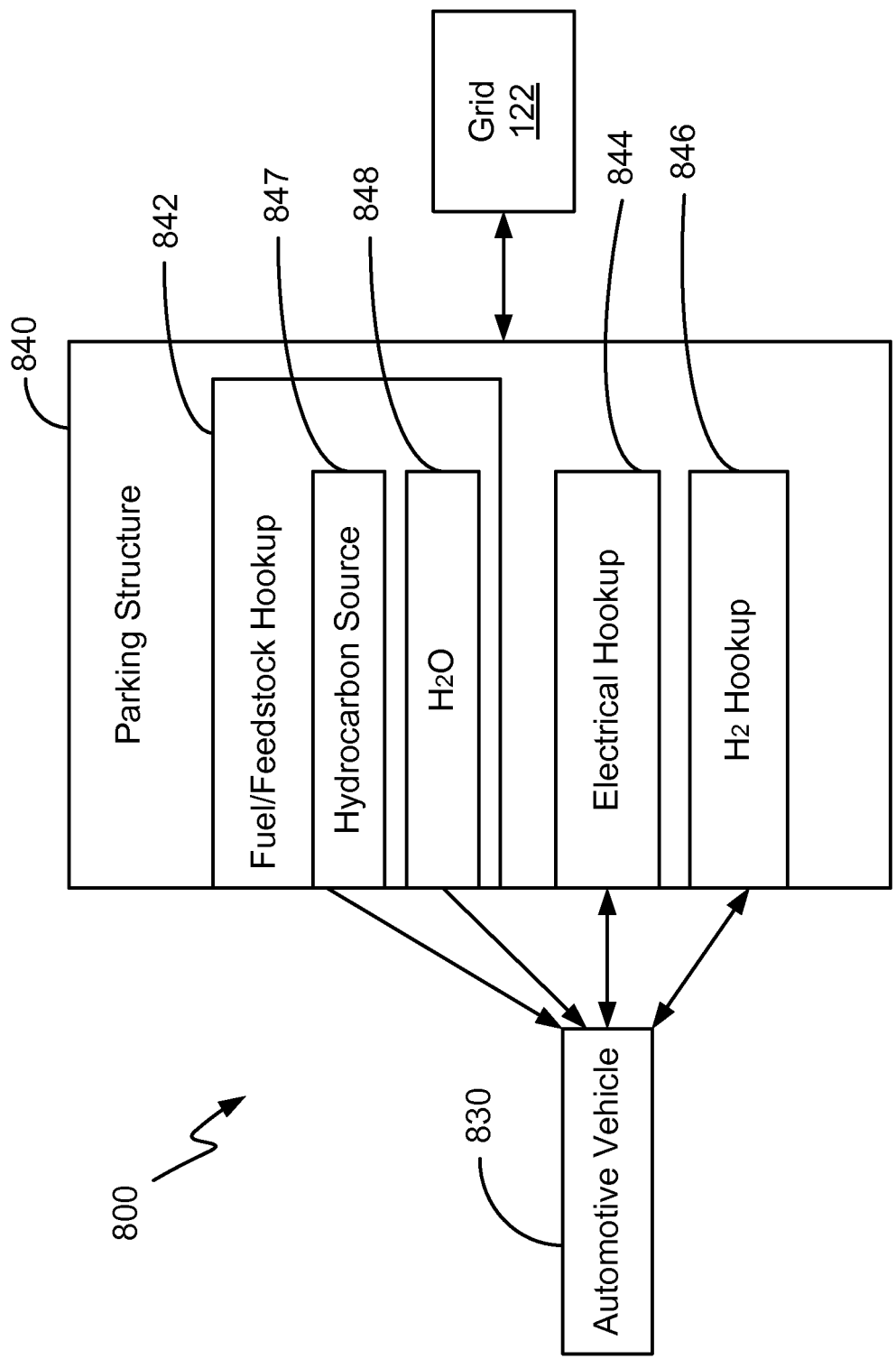
FIG. 12 is a schematic diagram of another fueling system that is compatible with embodiments of the systems of FIGS. 8-10.

FIG. 12 illustrates another embodiment of a fueling system 800 configured for use with an automotive vehicle 820 such as any of the automotive vehicles 420, 520, 620 described above. The system 800 can include a parking structure 840 that can include a fuel/feedstock hookup 842, which may include connections to a hydrocarbon source 847 and a water line 848, an electrical hookup 844, and a hydrogen hookup 846. In various embodiments, the hydrogen hookup 846 can provide an outlet for vehicles 820 that may not include fuel cells to distribute hydrogen that has been produced by an onboard energy recovery system, or to preserve the fuel cells of those vehicles 820 that do have such fuel cells onboard. In some instances, the hydrogen hookup 846 may also be used to fuel a vehicle. Offloaded hydrogen may be converted to electricity onsite at the parking structure 840 for local needs and/or distribution to the grid, or it may be stored for future distribution to other hydrogen powered vehicles.

Figure 13:
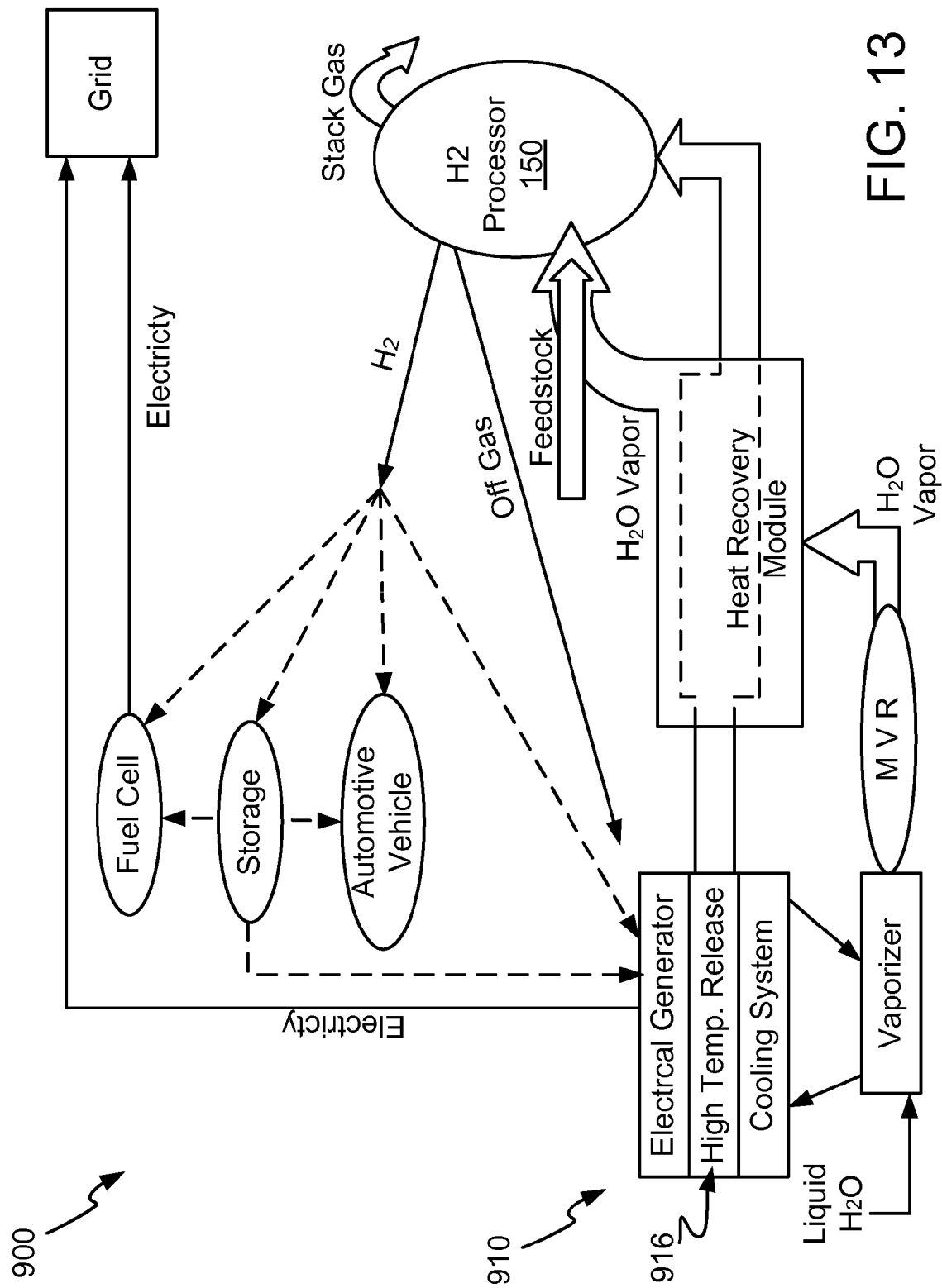
FIG. 13 is a schematic diagram of another embodiment of an energy recovery system that is configured to utilize waste heat from a base energy conversion system in the generation of hydrogen fuel.

FIG. 13 illustrates another embodiment of an energy recovery system 900 that can resemble the energy recovery systems described above. The energy recovery system 900 can include a base energy conversion system 910 can comprise any suitable source of heat that does not produce exhaust, but nevertheless provides a high temperature release 916 that could power a hydrogen processor 150.

Figure 14:
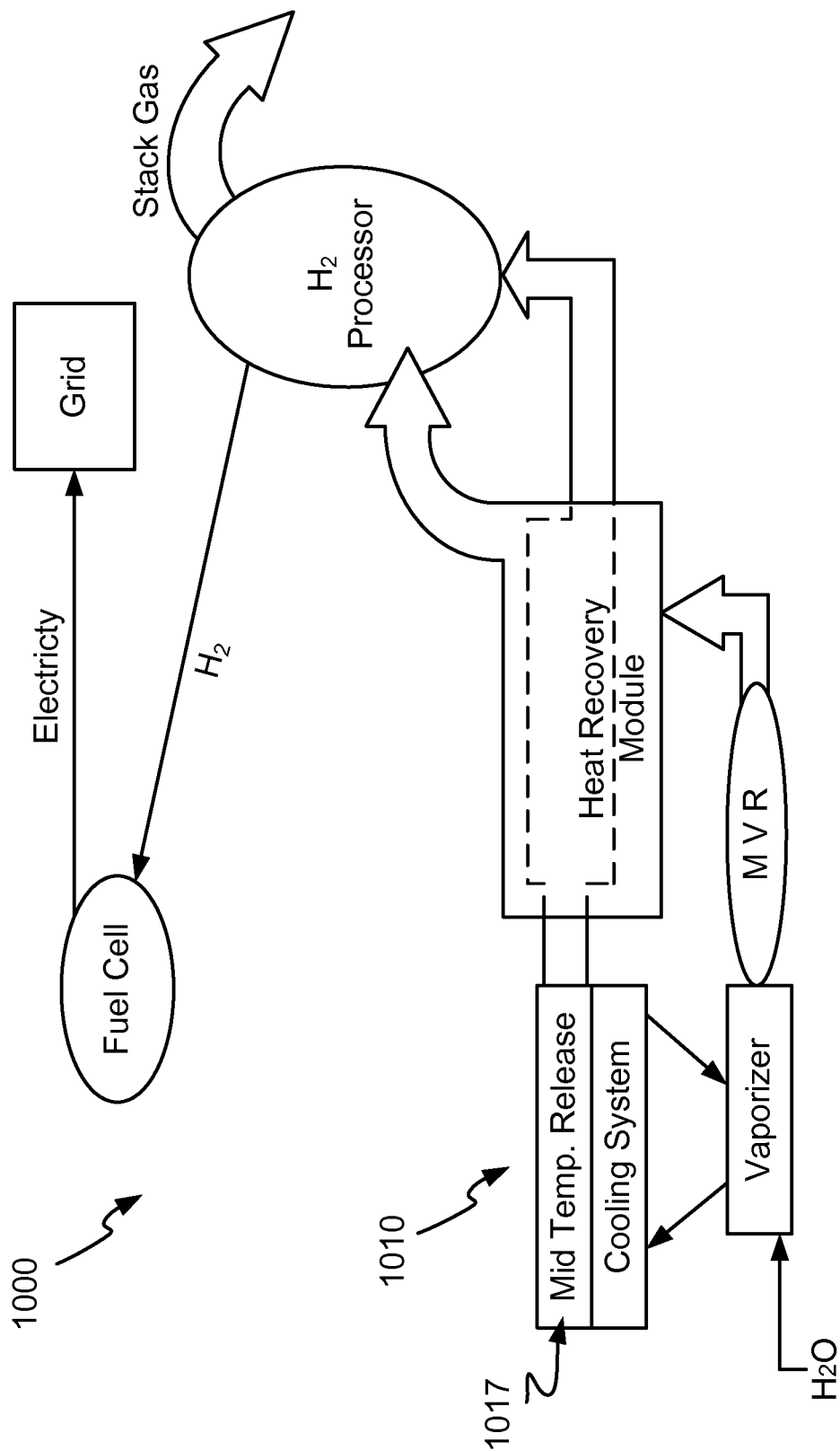
FIG. 14 is a schematic diagram of a further embodiment of an energy recovery system that is configured to utilize waste heat from a base energy conversion system in the generation of hydrogen fuel.

FIG. 14 illustrates another embodiment of an energy recovery system 1000 that can resemble the energy recovery systems described above. The energy recovery system 1000 can include a base energy conversion system 1010 that produces a mid-temperature release 1017, rather than a high temperature release. For example, the base energy conversion system 1010 can comprise a change of state system, a refrigeration unit, a cooling tower, or other similar source of waste heat. Despite the lower temperatures provided by the base energy conversion system 1010, the waste heat can nevertheless be used to successfully power certain hydrogen processors 150.

Figure 15:
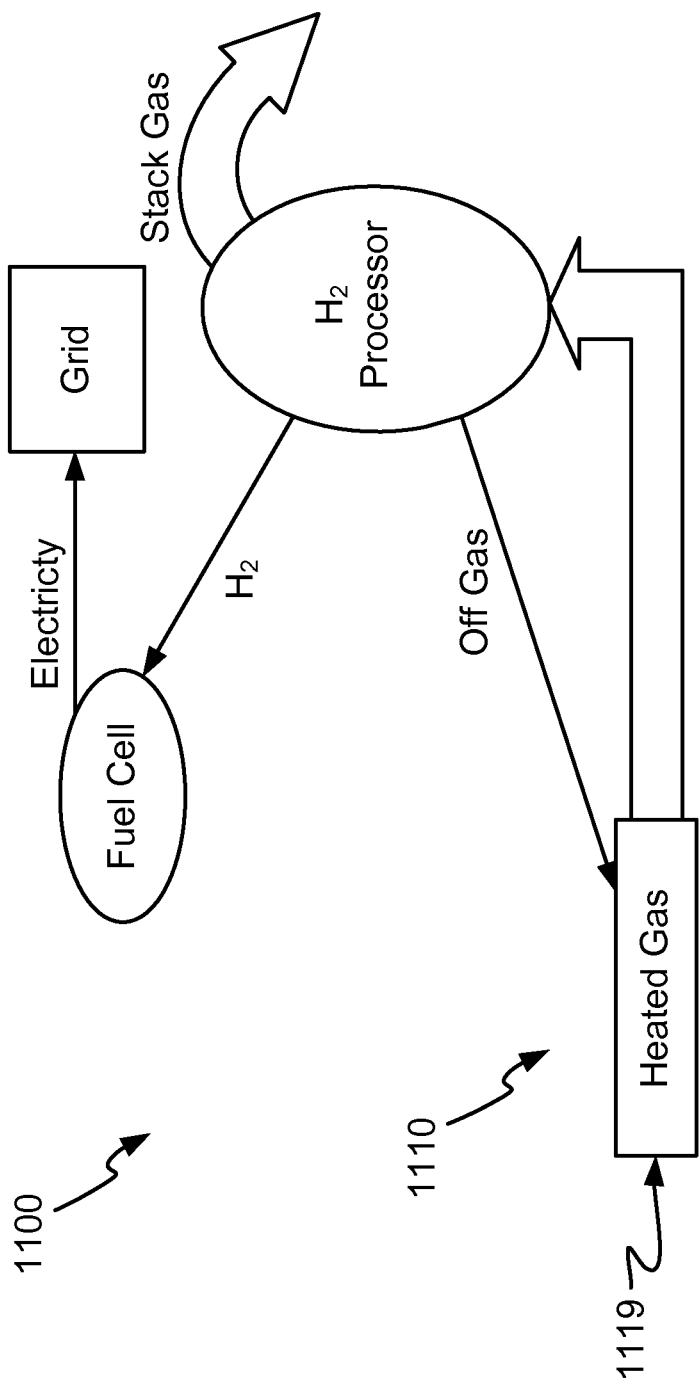
FIG. 15 is a schematic diagram of a further embodiment of an energy recovery system that is configured to utilize waste heat from a base energy conversion system in the generation of hydrogen fuel.

FIG. 15 illustrates another embodiment of an energy recovery system 1100 that can resemble the energy recovery systems described above. The energy recovery system 1100 can include a base energy conversion system 1110 that is primarily devoted to producing heated gases 1119 or other high-grade heat outputs, such as boilers or industrial furnaces. The heat can be used to power hydrogen processors 150, and in some embodiments, off gases 154 can be recycled back to the base energy conversion system 1110 as fuel.

Figure 16:
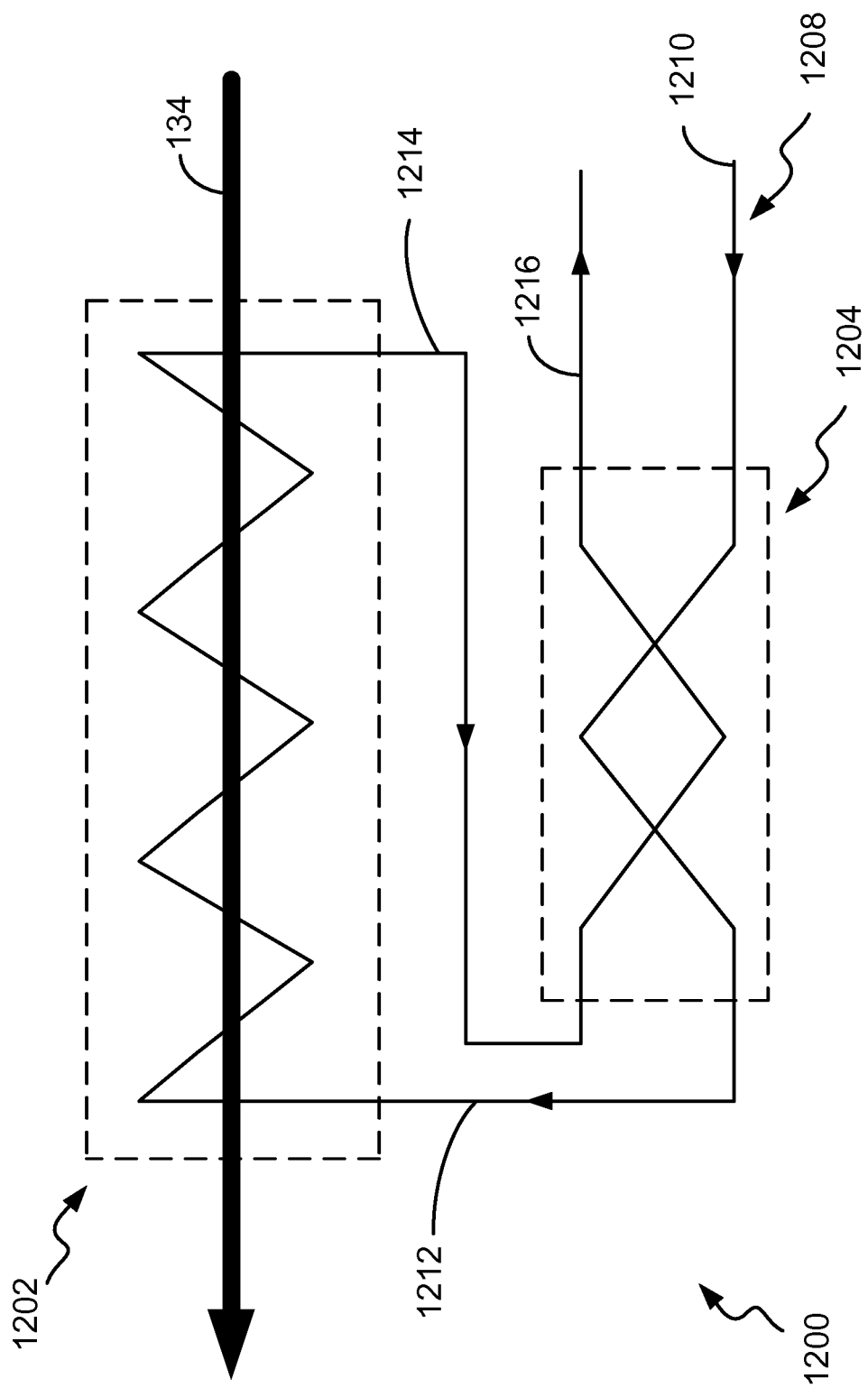
FIG. 16 is a schematic diagram of a pasteurization system that can be used with an energy recovery system.

FIG. 16 illustrates an embodiment of a purification or pasteurization system 1200 that can be used in conjunction with any suitable energy recovery system discussed above. The illustrated pasteurization system 1200 is shown in use with the energy recovery system 100 of FIG. 1. The pasteurization system 1200 can include a primary heat exchanger 1202 and a secondary heat exchanger 1204. The primary heat exchanger 1202 can be coupled with the return pathway 134 through which engine coolant fluid flows so as to draw heat therefrom and/or so as to be maintained at an elevated temperature. The secondary heat exchanger 1204 can be used to reduce the amount of heat that is drawn from the return pathway 134. In the illustrated embodiment, both heat exchangers 1202, 1204 are defined by a single fluid pathway 1208.

In operation, any suitable substance for which pasteurization is desired is delivered through the fluid pathway 1208 at the position 1210 and flows through the fluid pathway 1208 in the direction of the arrows. In particular, the substance passes through the secondary heat exchanger 1204, then through the primary heat exchanger 1202, then back through the secondary heat exchanger 1204. Substances for which pasteurization may be desired can include, for example, beverages (e.g., water, milk, juice, etc.) or foods (e.g., applesauce).

For the remainder of the discussion regarding the pasteurization system 1200, water is identified as the substance that is provided through the fluid pathway 1208, for the sake of convenience. At the position 1210, the water may be initially be at a temperature that is at or below room temperature. In making its initial pass through the secondary heat exchanger 1204, the water heats up to an elevated temperature due to its interaction with water that has previously passed through the primary heat exchanger. Thus, at the position 1212, the water may be at a temperature that is about the same or somewhat less than the temperature of the water at the position 1214. Accordingly, little heat from the return pathway 134 is transferred to the water as it passes through the primary heat exchanger 1202.

The primary heat exchanger 1202 can be used to ensure pasteurization of the water. Pasteurization can take place under a variety of conditions. For example, pasteurization can occur where liquid is maintained at a temperature of 161 degrees Fahrenheit for about 15 to 20 seconds. Higher temperatures can result in quicker pasteurization. For example, liquids that are maintained at a temperature of 275 degrees Fahrenheit can be pasteurized in a fraction of a second. Accordingly, flow rates through the pathway 1218 can be controlled such that water is maintained at a sufficient temperature for pasteurization.

After the water has passed through the primary heat exchanger 1202 and has been pasteurized thereby, it is passed back through the secondary heat exchanger 1204 so as to heat up incoming water. This heat exchange lowers the temperature of the outgoing, pasteurized water, such that the temperature of the water at the position 1216 may be slightly above that at the entry position 1210.

In other embodiments, the secondary heat exchanger 1202, which may be referred to as a recovery heat exchanger, may be omitted. The primary heat exchanger 1202 thus may remove more energy from the return line 134. In either case, embodiments that employ a pasteurization system 1200 thus can provide potable water without drawing significant energy from a base energy conversion system.

As noted above with respect to Example 2, in some embodiments, a temperature of coolant within the return pathway 134 is about 226 degrees Fahrenheit, thus pasteurization can take place in a matter of seconds when the water nears this temperature.

In some embodiments, water may flow through the pathway 1208 at a rate of about 12 gallons per day. Its temperature at the position 1210 may be about 54 degrees Fahrenheit. Its temperature at the position 1212 may be at or near the working temperature, or a temperature at which pasteurization can proceed. After passing through the secondary heat exchanger 1204 to the position 1216, the water may be at a temperature of about 60 degrees.

Example 3

In an illustrative embodiment, the energy recovery system 100 described above with respect to Example 2 may be used. That is, various embodiments of the pasteurization system 1200 can be coupled with the return line 134 of the energy recovery system 100 described with respect to Example 2. In some instances, both heat exchangers 1202, 1204 may be used, whereas in other embodiments, only the primary heat exchanger 1202 may be used. As can be seen in Table 2, use of both heat exchangers can significantly reduce the amount of energy that is consumed in the pasteurization process.

TABLE 2

| Parameter | System 1200 Including Only Primary Heat Exchanger 1202 | System 1200 Including Primary Heat Exchanger 1202 and Secondary Heat Exchanger 1204 |
|---|---|---|
| Gallons of water per day | 10,000 | 10,000 |
| Pounds of water per day | 80,000 | 80,000 |
| Temperature at position 1210 (Fahrenheit) | N/A | 54 degrees |
| Temperature at position 1212 (Fahrenheit) | 54 degrees | 175 degrees |
| Operating temperature (at which pasteurization occurs) (Fahrenheit) | 180 degrees | 180 degrees |
| Temperature rise of substance within the system 1200 when within the primary heat exchanger 1202 (Fahrenheit) | 126 degrees | 5 degrees |
| Temperature at position 1214 (Fahrenheit) | 180 degrees | 180 degrees |
| Temperature at position 1216 (Fahrenheit) | N/A | 56 degrees |
| Energy for entire process 100 per day | 10,080,000 BTU | 400,000 BTU |

TABLE 2-continued

| Parameter | System 1200 Including Only Primary Heat Exchanger 1202 | System 1200 Including Primary Heat Exchanger 1202 and Secondary Heat Exchanger 1204 |
|---|---|---|
| Energy for entire process 100 per minute | 7,000 BTU | 278 BTU |
| Amount of energy used by system 1200 relative to entire process 100 | 32.6% | 1.3% |

Although not shown in the drawings, any of the energy recovery systems disclosed herein, or portions thereof, can include any suitable control system (e.g., one or more programmable logic controllers). The control system can monitor outputs from some portions of an energy recovery system and dynamically control inputs to other portions of the energy recovery system in response thereto in any suitable manner.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, inventive aspects lie in a combination of fewer than all features of any single foregoing disclosed embodiment. Recitation in the claims of the term "first" with respect to a feature or element does not necessarily imply the existence of a second or additional such feature or element. It will be apparent to those having skill in the art that changes may be made to the details of the above-described embodiments without departing from the underlying principles set forth herein.

The invention claimed is:

1. An energy recovery system comprising:
a base energy conversion system comprising:
an energy converter that is configured to convert fuel into a high-grade waste heat component and a low-grade waste heat component,
a high-grade waste heat channel configured to receive and convey the high-grade waste heat component; and
a first low-grade heat channel configured to receive and convey the low-grade waste heat component,
wherein the high-grade waste heat component is at a higher temperature than is the low-grade waste heat component;
a hydrogen processor that is configured to utilize heated water vapor to generate hydrogen gas; and
a low-grade heat recovery system that is coupled with the first low-grade heat channel, comprising:
a vaporizer configured to vaporize water;
a mechanical vapor recompressor that is in selective fluid communication with the vaporizer, wherein the mechanical vapor recompressor is configured to maintain a threshold pressure level within the vaporizer; and
a second low-grade heat channel coupled to the vaporizer and configured to transport the low-grade waste heat component to the hydrogen processor by transporting at least a portion of the low-grade waste heat component in the form of latent heat,
wherein the vaporized water is heated by at least a portion of the high-grade waste heat component within the low-grade heat recovery system as the vaporized water is being transported to the hydrogen processor.

2. The energy recovery system of claim 1, wherein the energy converter comprises an internal combustion engine, wherein exhaust from the internal combustion engine comprises the high-grade waste heat component, and wherein engine coolant that cycles from the internal combustion engine comprises the first low-grade waste heat component.

3. The energy recovery system of claim 2, wherein the vaporizer comprises a chamber and a heat exchanging pathway through which the engine coolant flows, and wherein liquid water that is introduced into the chamber draws sensible heat from the engine coolant so as to undergo a change of state.

4. The energy recovery system of claim 3, wherein the low-grade heat recovery system is configured to draw more sensible heat from the engine coolant for a given mass of liquid water that is introduced into the chamber than if the water were introduced into the chamber having already been vaporized due to the latent heat of vaporization of the water, such that the liquid water can serve as a low mass energy carrier.

5. The energy recovery system of claim 3, wherein vaporized water from the vaporizer is introduced into the mechanical vapor recompressor via one or more one-way valves.

6. The energy recovery system of claim 1, wherein the mechanical vapor recompressor comprises a reciprocating piston that comprises a one-way valve.

7. The energy recovery system of claim 1, further comprising:
a heat recovery module that comprises a first environment and a second environment that are physically separated from each other and that are configured to interact with each other via a thermal interface,
wherein the high-grade waste heat channel is coupled with the first environment of the heat recovery module so as to transport the high-grade heat component to the first environment of the heat recovery module, and
wherein the second low-grade heat channel is configured to provide the vaporized water to the second environment so that the vaporized water can be heated by at least a portion of the high-grade waste heat component.

8. The energy recovery system of claim 7, wherein the high-grade heat component and the vaporized water are delivered from the heat recovery module to the hydrogen processor along physically separate pathways.

9. The energy recovery system of claim 1, wherein the base energy conversion system, the hydrogen processor, and the low-grade heat recovery system are positioned onboard a mobile platform.

10. The energy recovery system of claim 1, further comprising a superheater that is configured to receive waste heat energy from the hydrogen processor.

11. The energy recovery system of claim 1, wherein the base energy conversion system comprises a cooling system that is configured to remove the low-grade waste heat component from the base energy conversion system, wherein the energy recovery system further comprises a first heat exchanger coupled with the cooling system, and wherein one or more substances may be passed through the heat exchanger to thereby remove a portion of the low-grade waste heat component from the cooling system and be pasteurized.

12. The energy recovery system of claim 11, further comprising a second heat exchanger coupled with the first heat exchanger, wherein the second heat exchanger includes an input line and an output line that thermally interact with each other.

13. The energy recovery system of claim 12, wherein said one or more substances are configured to pass consecutively through the input line of the second heat exchanger, through the first heat exchanger, and then through the output line of the second heat exchanger.

14. A method of recovering waste heat, the method comprising:
  removing waste heat from an energy converter;
  delivering the waste heat to a vaporizer;
  introducing liquid water into the vaporizer;
  heating the liquid water with at least a portion of the waste heat so as to transition the liquid water to a vapor; and
  transporting the water vapor to a hydrogen processor,
  wherein removing the waste heat from the energy converter comprises cycling a coolant fluid through the energy converter, and wherein delivering the waste heat to the vaporizer comprises cycling the coolant fluid through the vaporizer.

15. A method of recovering waste heat, the method comprising:
  removing waste heat from an energy converter;
  delivering the waste heat to a vaporizer;
  introducing liquid water into the vaporizer;
  heating the liquid water with at least a portion of the waste heat so as to transition the liquid water to a vapor; and
  transporting the water vapor to a hydrogen processor,
  wherein transporting the water vapor to the hydrogen processor comprises passing the water vapor through a mechanical vapor recompressor.

16. The method of claim 15, wherein the mechanical vapor recompressor comprises a first chamber and a second chamber, the method further comprising:
  passing at least a portion of the water vapor through a first one-way valve into the first chamber; and
  passing at least a portion of the water vapor through a second one-way valve into the second chamber.

17. A method of recovering waste heat, the method comprising:
  removing a first variety of waste heat from an energy converter;
  delivering the waste heat to a vaporizer;
  introducing liquid water into the vaporizer;
  heating the liquid water with at least a portion of the waste heat so as to transition the liquid water to a vapor;
  transporting the water vapor to a hydrogen processor;
  removing a second variety of waste heat from the energy converter;
  delivering the water vapor to a first environment within a heat recovery module;
  delivering the second variety of waste heat to a second environment within the heat recovery module; and
  permitting thermal interaction between the water vapor and the second variety of waste heat.

18. The method of claim 17, further comprising delivering at least a portion of the second variety of waste heat and at least a portion of the water vapor from the heat recovery module to the hydrogen processor.

19. An energy recovery system comprising:
  a base energy conversion system comprising:
    an energy converter that is configured to convert fuel into a high-grade waste heat component and a low-grade waste heat component,
    a high-grade waste heat channel configured to receive and convey the high-grade waste heat component; and
    a first low-grade heat channel configured to receive and convey the low-grade waste heat component,
    wherein the high-grade waste heat component is at a higher temperature than is the low-grade waste heat component;
  a hydrogen processor that is configured to utilize heated water vapor to generate hydrogen gas; and
  a low-grade heat recovery system that is coupled with the first low-grade heat channel, comprising:
    a vaporizer configured to vaporize water; and
    a second low-grade heat channel coupled to the vaporizer and configured to transport the low-grade waste heat component to the hydrogen processor by transporting at least a portion of the low-grade waste heat component in the form of latent heat,
  wherein the vaporized water is heated by at least a portion of the high-grade waste heat component within the low-grade heat recovery system as the vaporized water is being transported to the hydrogen processor,
  wherein the energy converter comprises an internal combustion engine, wherein exhaust from the internal combustion engine comprises the high-grade waste heat component, and wherein engine coolant that cycles from the internal combustion engine comprises the first low-grade waste heat component,
  wherein the vaporizer comprises a chamber and a heat exchanging pathway through which the engine coolant flows, and wherein liquid water that is introduced into the chamber draws sensible heat from the engine coolant so as to undergo a change of state, and
  wherein vaporized water from the vaporizer is introduced into the mechanical vapor recompressor via one or more one-way valves.

20. The energy recovery system of claim 19, wherein the low-grade heat recovery system is configured to draw more sensible heat from the engine coolant for a given mass of liquid water that is introduced into the chamber than if the water were introduced into the chamber having already been vaporized due to the latent heat of vaporization of the water, such that the liquid water can serve as a low mass energy carrier.

21. The energy recovery system of claim 19, wherein the mechanical vapor recompressor comprises a reciprocating piston that comprises a one-way valve.

22. The energy recovery system of claim 19, further comprising:
  a heat recovery module that comprises a first environment and a second environment that are physically separated from each other and that are configured to interact with each other via a thermal interface,
  wherein the high-grade waste heat channel is coupled with the first environment of the heat recovery module so as to transport the high-grade heat component to the first environment of the heat recovery module, and
  wherein the second low-grade heat channel is configured to provide the vaporized water to the second environment so that the vaporized water can be heated by at least a portion of the high-grade waste heat component.

23. The energy recovery system of claim 22, wherein the high-grade heat component and the vaporized water are delivered from the heat recovery module to the hydrogen processor along physically separate pathways.

24. The energy recovery system of claim 19, wherein the base energy conversion system, the hydrogen processor, and the low-grade heat recovery system are positioned onboard a mobile platform.

25. The energy recovery system of claim 19, further comprising a superheater that is configured to receive waste heat energy from the hydrogen processor.

26. The energy recovery system of claim 19, wherein the base energy conversion system comprises a cooling system that is configured to remove the low-grade waste heat component from the base energy conversion system, wherein the energy recovery system further comprises a first heat exchanger coupled with the cooling system, and wherein one or more substances may be passed through the heat exchanger to thereby remove a portion of the low-grade waste heat component from the cooling system and be pasteurized.

27. The energy recovery system of claim 26, further comprising a second heat exchanger coupled with the first heat exchanger, wherein the second heat exchanger includes an input line and an output line that thermally interact with each other.

28. The energy recovery system of claim 27, wherein said one or more substances are configured to pass consecutively through the input line of the second heat exchanger, through the first heat exchanger, and then through the output line of the second heat exchanger.

29. An energy recovery system comprising:
a base energy conversion system comprising:
an energy converter that is configured to convert fuel into a high-grade waste heat component and a low-grade waste heat component,
a high-grade waste heat channel configured to receive and convey the high-grade waste heat component; and
a first low-grade heat channel configured to receive and convey the low-grade waste heat component,
wherein the high-grade waste heat component is at a higher temperature than is the low-grade waste heat component;
a low-grade heat recovery system that is coupled with the first low-grade heat channel, comprising:
a vaporizer configured to vaporize water; and
a second low-grade heat channel coupled to the vaporizer and configured to transport the low-grade waste heat component to the hydrogen processor by transporting at least a portion of the low-grade waste heat component in the form of latent heat;
a hydrogen processor that is configured to utilize heated water vapor to generate hydrogen gas; and
a superheater that is configured to receive waste heat energy from the hydrogen processor,
wherein the vaporized water is heated by at least a portion of the high-grade waste heat component within the low-grade heat recovery system as the vaporized water is being transported to the hydrogen processor.

30. The energy recovery system of claim 29, wherein the energy converter comprises an internal combustion engine, wherein exhaust from the internal combustion engine comprises the high-grade waste heat component, and wherein engine coolant that cycles from the internal combustion engine comprises the first low-grade heat component.

31. The energy recovery system of claim 30, wherein the vaporizer comprises a chamber and a heat exchanging pathway through which the engine coolant flows, and wherein liquid water that is introduced into the chamber draws sensible heat from the engine coolant so as to undergo a change of state.

32. The energy recovery system of claim 31, wherein the low-grade heat recovery system is configured to draw more sensible heat from the engine coolant for a given mass of liquid water that is introduced into the chamber than if the water were introduced into the chamber having already been vaporized due to the latent heat of vaporization of the water, such that the liquid water can serve as a low mass energy carrier.

33. The energy recovery system of claim 29, wherein the mechanical vapor recompressor comprises a reciprocating piston that comprises a one-way valve.

34. The energy recovery system of claim 29, wherein the base energy conversion system, the hydrogen processor, and the low-grade heat recovery system are positioned onboard a mobile platform.

35. The energy recovery system of claim 29, wherein the base energy conversion system comprises a cooling system that is configured to remove the low-grade waste heat component from the base energy conversion system, wherein the energy recovery system further comprises a first heat exchanger coupled with the cooling system, and wherein one or more substances may be passed through the heat exchanger to thereby remove a portion of the low-grade waste heat component from the cooling system and be pasteurized.

36. The energy recovery system of claim 35, further comprising a second heat exchanger coupled with the first heat exchanger, wherein the second heat exchanger includes an input line and an output line that thermally interact with each other.

37. The energy recovery system of claim 36, wherein said one or more substances are configured to pass consecutively through the input line of the second heat exchanger, through the first heat exchanger, and then through the output line of the second heat exchanger.

38. An energy recovery system comprising:
a base energy conversion system comprising:
an energy converter that is configured to convert fuel into a high-grade waste heat component and a low-grade waste heat component,
a high-grade waste heat channel configured to receive and convey the high-grade waste heat component; and
a first low-grade heat channel configured to receive and convey the low-grade waste heat component,
wherein the high-grade waste heat component is at a higher temperature than is the low-grade waste heat component;
a hydrogen processor that is configured to utilize heated water vapor to generate hydrogen gas; and
a low-grade heat recovery system that is coupled with the first low-grade heat channel, comprising:
a vaporizer configured to vaporize water; and
a second low-grade heat channel coupled to the vaporizer and configured to transport the low-grade waste heat component to the hydrogen processor by transporting at least a portion of the low-grade waste heat component in the form of latent heat,
wherein the vaporized water is heated by at least a portion of the high-grade waste heat component within the low-grade heat recovery system as the vaporized water is being transported to the hydrogen processor,
wherein the base energy conversion system comprises a cooling system that is configured to remove the low-grade waste heat component from the base energy conversion system, wherein the energy recovery system further comprises a first heat exchanger coupled with the cooling system, and wherein one or more substances may be passed through the heat exchanger to thereby remove a portion of the low-grade waste heat component from the cooling system and be pasteurized, the energy recovery system further comprising a second heat exchanger coupled with the first heat exchanger, wherein the second heat exchanger includes an input line and an output line that thermally interact with each other, and wherein said one or more substances are configured to pass consecutively through the input line of the second heat exchanger, through the first heat exchanger, and then through the output line of the second heat exchanger.

\* \* \* \* \*